US010458526B2

(12) United States Patent
Nichols et al.

(10) Patent No.: US 10,458,526 B2
(45) Date of Patent: Oct. 29, 2019

(54) CONTINUOUSLY VARIABLE TRANSMISSIONS, SYSTEMS AND METHODS

(71) Applicant: Fallbrook Intellectual Property Company LLC, Cedar Park, TX (US)

(72) Inventors: Jon M. Nichols, Georgetown, TX (US); Brian Benjamin Sweet, Leander, TX (US); Brad P. Pohl, Leander, TX (US); Fernand A. Thomassy, Liberty Hill, TX (US); William J. Elliott, Austin, TX (US); David Galvin, Leander, TX (US); Daniel J. Dawe, Austin, TX (US); David Brian Jackson, Cedar Park, TX (US); Wayne Leroy Contello, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 159 days.

(21) Appl. No.: 15/462,502

(22) Filed: Mar. 17, 2017

(65) Prior Publication Data
US 2017/0268638 A1   Sep. 21, 2017

Related U.S. Application Data

(60) Provisional application No. 62/310,559, filed on Mar. 18, 2016.

(51) Int. Cl.
*F16H 15/50*   (2006.01)
*F16H 61/664*  (2006.01)
*F16H 15/28*   (2006.01)

(52) U.S. Cl.
CPC .......... *F16H 15/503* (2013.01); *F16H 15/28* (2013.01); *F16H 61/664* (2013.01); *F16H 61/6646* (2013.01)

(58) Field of Classification Search
CPC ...... F16H 15/503; F16H 61/664; F16H 15/52; F16H 2037/026
See application file for complete search history.

(56) References Cited

U.S. PATENT DOCUMENTS

| 719,595 A | 2/1903 | Huss |
| 1,121,210 A | 12/1914 | Techel |

(Continued)

FOREIGN PATENT DOCUMENTS

| CA | 2756273 A1 * | 10/2010 | ............. F16H 15/52 |
| CH | 118064 | 12/1926 | |

(Continued)

OTHER PUBLICATIONS

International Search Report and Written Opinion dated Jul. 6, 2017 in PCT/US2017/022979, (27 pages).

*Primary Examiner* — Mark J Beauchaine
(74) *Attorney, Agent, or Firm* — Knobbe Martens Olson & Bear LLP

(57) ABSTRACT

Components, subassemblies, systems, and/or methods for improving the performance and increasing the life of continuously variable transmissions (CVT). A first stator may be formed with an outer diameter greater than an outer diameter of a second stator. A stator may have radial slots formed to extend farther radially inward than slots on the other stator. The larger outer diameter of a stator or the formation of guide slots on a first stator extending farther radially inward of guide slots on a second stator may prevent egress of a planet axle from a radial slot, increase range of the CVT, allow for larger tolerances to reduce losses, and other advantages, Slots on a timing plate may be formed having a width greater than a width of guide slots formed on either stator to allow the stators to control adjustments while the timing plate avoids runaway axles. The shape, including junction between surfaces on a timing plate or stator may (Continued)

also prevent an axle from egressing. Any one or a combination of these features allow a CVT to be formed smaller and lighter to allow for clearance in smaller environments and for reduced inertia.

15 Claims, 14 Drawing Sheets

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,023,442 A | 5/1977 | Woods et al. |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |
| 4,560,369 A | 12/1985 | Hattori |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |

(56) References Cited

U.S. PATENT DOCUMENTS

| | | |
|---|---|---|
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,035 B2 | 8/2002 | Tsukada et al. |
| 6,440,037 B2 | 8/2002 | Takagi et al. |
| 6,459,978 B2 | 10/2002 | Taniguchi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,558,285 B1 | 5/2003 | Sieber |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |

(56) References Cited

U.S. PATENT DOCUMENTS

| | | |
|---|---|---|
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,207,918 B2 | 4/2007 | Shimazu |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |

(56) References Cited

U.S. PATENT DOCUMENTS

| | | |
|---|---|---|
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,814,739 B1 | 8/2014 | Hamrin et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,956,262 B2 | 2/2015 | Tomomatsu et al. |
| 8,961,363 B2 | 2/2015 | Shiina et al. |
| 8,992,376 B2 | 3/2015 | Ogawa et al. |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |
| 9,279,482 B2 | 3/2016 | Nichols et al. |
| 9,291,251 B2 | 3/2016 | Lohr et al. |
| 9,328,807 B2 | 5/2016 | Carter et al. |
| 9,341,246 B2 | 5/2016 | Miller et al. |
| 9,360,089 B2 | 6/2016 | Lohr et al. |
| 9,365,203 B2 | 6/2016 | Keilers et al. |
| 9,371,894 B2 | 6/2016 | Carter et al. |
| 9,388,896 B2 | 7/2016 | Hibino et al. |
| 9,506,562 B2 | 11/2016 | Miller et al. |
| 9,528,561 B2 | 12/2016 | Nichols et al. |
| 9,574,642 B2 | 2/2017 | Pohl et al. |
| 9,574,643 B2 | 2/2017 | Pohl |
| 9,611,921 B2 | 4/2017 | Thomassy et al. |
| 9,618,100 B2 | 4/2017 | Lohr |
| 9,656,672 B2 | 5/2017 | Schieffelin |
| 9,878,719 B2 | 1/2018 | Carter et al. |
| 9,963,199 B2 | 5/2018 | Hancock et al. |
| 10,023,266 B2 | 7/2018 | Contello et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0161503 A1 | 10/2002 | Joe et al. |
| 2002/0169051 A1 | 11/2002 | Oshidari |
| 2002/0179348 A1 | 12/2002 | Tamai et al. |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0064986 A1 | 3/2005 | Ginglas |
| 2005/0085979 A1 | 4/2005 | Carlson et al. |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2007/0232423 A1 | 10/2007 | Katou et al. |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0145573 A1 | 6/2010 | Vasilescu |
| 2010/0181130 A1 | 7/2010 | Chou |
| 2011/0127096 A1 | 6/2011 | Schneidewind |
| 2011/0190093 A1 | 8/2011 | Bishop |

(56) References Cited

U.S. PATENT DOCUMENTS

| | | | |
|---|---|---|---|
| 2011/0230297 | A1 | 9/2011 | Shiina et al. |
| 2011/0237385 | A1 | 9/2011 | Andre Parise |
| 2011/0291507 | A1 | 12/2011 | Post |
| 2011/0319222 | A1 | 12/2011 | Ogawa et al. |
| 2012/0035011 | A1 | 2/2012 | Menachem et al. |
| 2012/0035015 | A1 | 2/2012 | Ogawa et al. |
| 2012/0258839 | A1 | 10/2012 | Smithson et al. |
| 2013/0035200 | A1 | 2/2013 | Noji et al. |
| 2013/0053211 | A1 | 2/2013 | Fukuda et al. |
| 2013/0337971 | A1 | 12/2013 | Kostrup |
| 2014/0094339 | A1 | 4/2014 | Ogawa et al. |
| 2014/0148303 | A1 | 5/2014 | Nichols et al. |
| 2014/0274536 | A1 | 9/2014 | Versteyhe |
| 2014/0335991 | A1 | 11/2014 | Lohr et al. |
| 2015/0018154 | A1 | 1/2015 | Thomassy |
| 2015/0038285 | A1 | 2/2015 | Aratsu et al. |
| 2015/0051801 | A1 | 2/2015 | Quinn et al. |
| 2015/0080165 | A1 | 3/2015 | Pohl et al. |
| 2015/0226323 | A1 | 8/2015 | Pohl et al. |
| 2015/0260284 | A1 | 9/2015 | Miller et al. |
| 2015/0337928 | A1 | 11/2015 | Smithson |
| 2015/0345599 | A1 | 12/2015 | Ogawa |
| 2015/0369348 | A1 | 12/2015 | Nichols et al. |
| 2016/0003349 | A1 | 1/2016 | Kimura et al. |
| 2016/0031526 | A1 | 2/2016 | Watarai |
| 2016/0040763 | A1 | 2/2016 | Nichols et al. |
| 2016/0061301 | A1 | 3/2016 | Bazyn et al. |
| 2016/0131231 | A1 | 5/2016 | Carter et al. |
| 2016/0146342 | A1 | 5/2016 | Vasiliotis et al. |
| 2016/0186847 | A1 | 6/2016 | Nichols et al. |
| 2016/0201772 | A1 | 7/2016 | Lohr et al. |
| 2016/0244063 | A1 | 8/2016 | Carter et al. |
| 2016/0273627 | A1 | 9/2016 | Miller et al. |
| 2016/0281825 | A1 | 9/2016 | Lohr et al. |
| 2016/0290451 | A1 | 10/2016 | Lohr |
| 2016/0298740 | A1 | 10/2016 | Carter et al. |
| 2016/0347411 | A1 | 12/2016 | Yamamoto et al. |
| 2016/0362108 | A1 | 12/2016 | Keilers et al. |
| 2017/0072782 | A1 | 3/2017 | Miller et al. |
| 2017/0082049 | A1 | 3/2017 | David et al. |
| 2017/0103053 | A1 | 4/2017 | Nichols et al. |
| 2017/0159812 | A1 | 6/2017 | Pohl et al. |
| 2017/0163138 | A1 | 6/2017 | Pohl |
| 2017/0204948 | A1 | 7/2017 | Thomassy et al. |
| 2017/0204969 | A1 | 7/2017 | Thomassy et al. |
| 2017/0211698 | A1 | 7/2017 | Lohr |
| 2017/0225742 | A1 | 8/2017 | Hancock et al. |
| 2017/0276217 | A1 | 9/2017 | Nichols et al. |
| 2017/0284519 | A1 | 10/2017 | Kolstrup |
| 2017/0284520 | A1 | 10/2017 | Lohr et al. |
| 2017/0314655 | A1 | 11/2017 | Miller et al. |
| 2017/0328470 | A1 | 11/2017 | Pohl |
| 2017/0335961 | A1 | 11/2017 | Hamrin |
| 2017/0343105 | A1 | 11/2017 | Vasiliotis et al. |
| 2018/0066754 | A1 | 3/2018 | Miller et al. |
| 2018/0106359 | A1 | 4/2018 | Bazyn et al. |
| 2018/0134750 | A1 | 5/2018 | Pohl et al. |
| 2018/0148055 | A1 | 5/2018 | Carter et al. |
| 2018/0148056 | A1 | 5/2018 | Keilers et al. |
| 2018/0195586 | A1 | 7/2018 | Thomassy et al. |
| 2018/0202527 | A1 | 7/2018 | Nichols et al. |
| 2018/0236867 | A1 | 8/2018 | Miller et al. |
| 2018/0251190 | A1 | 9/2018 | Hancock et al. |
| 2018/0306283 | A1 | 10/2018 | Engesather et al. |
| 2018/0327060 | A1 | 11/2018 | Contello et al. |
| 2018/0347693 | A1 | 12/2018 | Thomassy et al. |
| 2018/0372192 | A1 | 12/2018 | Lohr |
| 2019/0049004 | A1 | 2/2019 | Quinn et al. |

FOREIGN PATENT DOCUMENTS

| | | |
|---|---|---|
| CN | 1054340 | 9/1991 |
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 2320843 Y | 5/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| CN | 101312867 | 11/2008 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 19851738 | 5/2000 |
| DE | 10155372 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 251 294 | 10/2002 |
| EP | 1 366 978 | 3/2003 |
| EP | 1 433 641 | 6/2004 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |
| GB | 391448 | 4/1933 |
| GB | 592320 | 9/1947 |
| GB | 858710 | 1/1961 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 46-029087 B1 | 8/1971 |
| JP | 47-000448 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 49-012742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 53-50395 U | 4/1978 |

(56) References Cited

FOREIGN PATENT DOCUMENTS

| | | |
|---|---|---|
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-225053 | 8/1998 |
| JP | 10-511621 | 11/1998 |
| JP | 11-063130 | 3/1999 |
| JP | 11-091411 | 4/1999 |
| JP | 11-210850 | 8/1999 |
| JP | 11-240481 | 9/1999 |
| JP | 11-257479 | 9/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003-194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-232776 | 8/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-14412 | 1/2008 |
| JP | 2008-133896 | 6/2008 |
| JP | 2010-069005 | 4/2010 |
| JP | 2012-107725 | 6/2012 |
| JP | 2012-122568 | 6/2012 |
| JP | 2012-211610 | 11/2012 |
| JP | 2012-225390 | 11/2012 |
| JP | 2015-227690 | 12/2015 |
| JP | 2015-227691 | 12/2015 |
| JP | 2015227690 A * | 12/2015 | ............ F16H 15/26 |
| KR | 2002 0054126 | 7/2002 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 07/077502 | 7/2007 |
| WO | WO 08/078047 | 7/2008 |
| WO | WO 08/100792 | 8/2008 |
| WO | WO 10/073036 | 7/2010 |
| WO | WO 10/135407 | 11/2010 |
| WO | WO 11/064572 | 6/2011 |
| WO | WO-2011/064572 A2 * | 6/2011 | ............ F02B 39/04 |
| WO | WO 11/101991 | 8/2011 |
| WO | WO 11/121743 | 10/2011 |
| WO | WO 12/030213 | 3/2012 |
| WO | WO 13/042226 | 3/2013 |
| WO | WO 14/186732 | 11/2014 |
| WO | WO 16/062461 | 4/2016 |

* cited by examiner

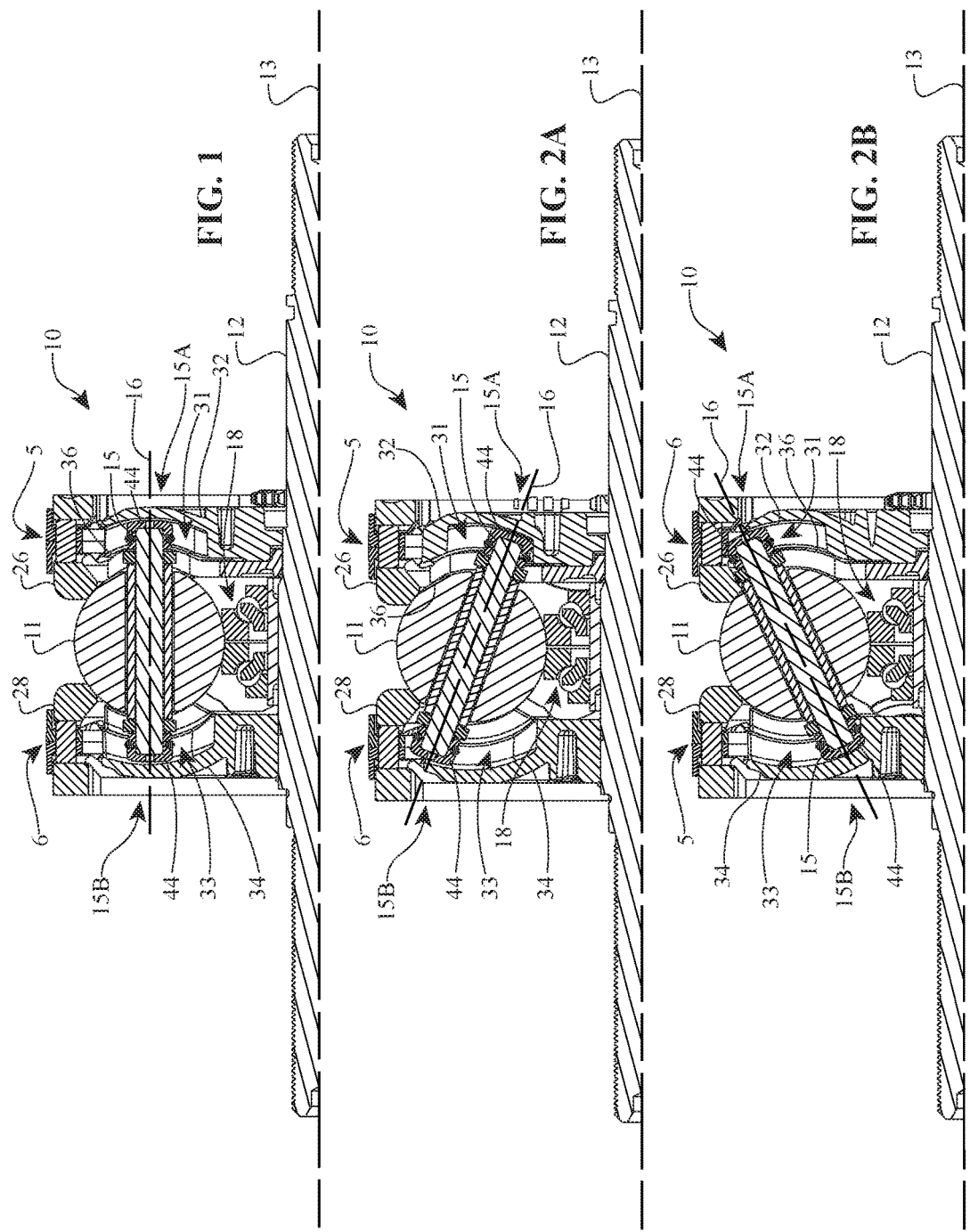

DETAIL A

DETAIL B

CONTINUOUSLY VARIABLE TRANSMISSIONS, SYSTEMS AND METHODS

CROSS-REFERENCE TO RELATED APPLICATIONS

The present application claims priority to U.S. Provisional Patent Application No. 62/310,559, filed on Mar. 18, 2016, which is hereby incorporated by reference in its entirety.

BACKGROUND

Field of the Disclosure

Embodiments disclosed herein relate generally to continuously variable transmissions, and more particularly to methods, assemblies, and components for continuously variable transmissions (CVTs).

Description of the Related Art

Continuously variable transmissions are becoming more popular as people understand the benefits and advantages of having a continuous range of transmission ratios instead of a finite set. There are well-known ways to achieve continuously variable ratios of input speed to output speed. Typically, a mechanism for adjusting the speed ratio of an output speed to an input speed in a CVT is known as a variator and a control system manages the variator so that the desired speed ratio can be achieved in operation. In a belt-type CVT, the variator consists of two adjustable pulleys coupled by a belt. A disadvantage to belt-type CVTs is the necessity of two axles—a drive axle and a driven axle—that are offset from one another and are not coaxial. In a single cavity toroidal-type CVT, the variator usually has two partially toroidal transmission discs rotating about a shaft and two or more disc-shaped power rollers rotating on respective axes that are perpendicular to the shaft and clamped between the input and output transmission discs. A common issue with toroidal-type CVTs is the variation in forces requires a robust and dynamic axial force generation system. In addition to adding cost and complexity to the system, these axial force generation systems add additional parasitic losses to the CVT.

Embodiments of the variator disclosed herein are of the ball type variator utilizing planets (also known as power or speed adjusters, balls, sphere gears, or rollers) that each has an axle defining a tiltable axis of rotation adapted to be adjusted to achieve a desired ratio of output speed to input speed during operation. The planets are angularly distributed about a longitudinal axis in a plane perpendicular to the longitudinal axis of a CVT. The planets receive power on one side from an input disc and transmit power on the other side to an output disc, one or both of which apply a clamping contact force for increased transmission of power. The input disc applies (input) power at an input torque and an input rotational speed to the planets. As the planets rotate about their own axes, the planets transmit the (output) power at an output torque and an output rotational speed to the output disc. The output speed to input speed ratio is a function of the radii of the contact points of the input and output discs to the axes of the planets. Tilting the axes of the planets with respect to the axis of the variator adjusts the speed ratio. The planets may receive or transmit power via direct contact with the input or output disc, or via contact with any of a type of fluid capable of transmitting power.

There is an ongoing desire for variators and control systems that provide improved performance and operational control.

SUMMARY OF THE DISCLOSURE

The systems and methods herein described have several features, no single one of which is solely responsible for its desirable attributes. Without limiting the scope as expressed by the claims that follow, its more prominent features will now be discussed briefly. After considering this discussion, one will understand how the features of the system and methods provide several advantages over traditional systems and methods.

In one broad respect, embodiments may be generally directed to ball planetary type variators in continuously variable transmissions. A ball planetary type continuously variable transmission may include a plurality of planets arranged angularly about and in contact with a sun assembly. The plurality of planets is interposed between a first traction ring and a second traction ring. Each planet has an axle defining a tiltable axis of rotation. The CVT may include a first disc having a first plurality of guide slots and a second disc having a second plurality of guide slots, each guide slot being configured for control of a first end or a second end of one of the plurality of axles.

In another broad respect, embodiments may be generally directed to methods for assembling ball planetary type continuously variable transmissions.

In another broad respect, embodiments may be generally directed to systems for controlling ball planetary type continuously variable transmissions.

In another broad respect, embodiments may be generally directed to methods for controlling ball planetary type continuously variable transmissions.

In another broad respect, embodiments may be generally directed to vehicles with drive trains including ball planetary type continuously variable transmissions. The vehicle power requirements may determine a minimum variator size, but vehicle dimensions may limit the size or weight of a continuously variable transmission. Additionally, the vehicle may benefit from a desired operating range of a CVT.

In another broad respect, embodiments may be generally directed to bicycles with drive trains including ball planetary type continuously variable transmissions. A rider may want a CVT that allows for the maximum operating range with the lightest weight.

BRIEF DESCRIPTION OF THE FIGURES

FIG. 1 is a cross section view of a ball planetary continuously variable transmission (CVT);

FIGS. 2A and 2B are cross-section views of a ball planetary CVT, illustrating under drive and over drive conditions;

DETAILED DESCRIPTION OF THE DISCLOSURE

Figure 3:
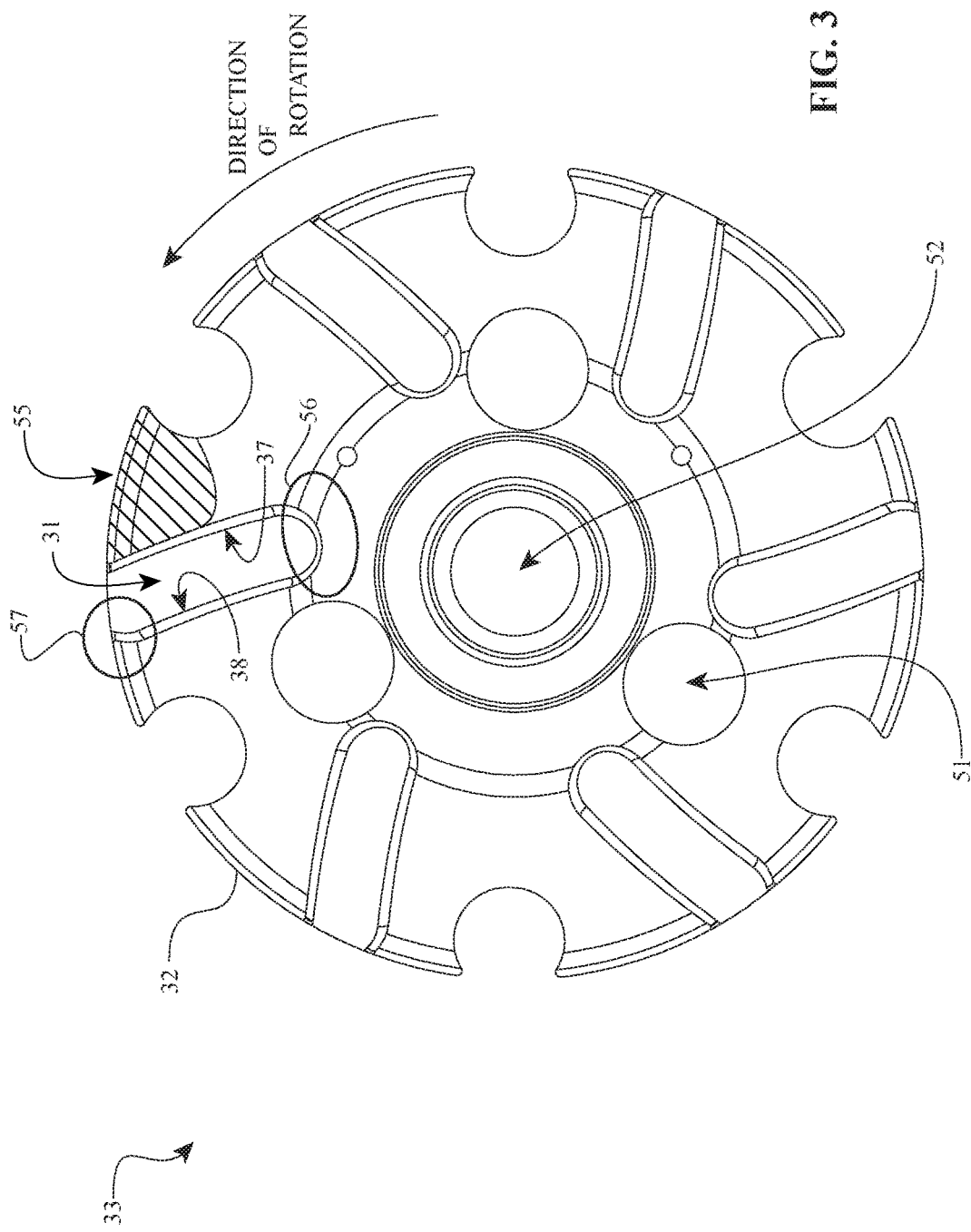
FIG. 3 is a side view of a stator, illustrating an area of concern when the CVT is operating in a forward direction.

Embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments. Furthermore, embodiments can include several inventive features, no single one of which is solely responsible for its desirable attributes or which is essential to practicing the systems and methods described herein.

As used herein, the terms "operationally connected", "operationally coupled", "operationally linked", "operably connected", "operably coupled", "operably linked," "in contact" and like terms, refer to a relationship (mechanical, linkage, coupling, etc.) between elements whereby operation of one element results in a corresponding, following, or simultaneous operation or actuation of a second element. It is noted that in using said terms to describe embodiments, specific structures or mechanisms that link or couple the elements may be described. However, unless otherwise specifically stated, when one of said terms is used, the term indicates that the actual linkage, coupling or contact may take a variety of forms.

For description purposes, the term "radial" is used herein to indicate a direction or position that is perpendicular relative to a longitudinal axis of a transmission or variator. "Radially inward" refers to a position relatively closer to a central point, whereas "radially outward" refers to a position relatively farther away from a central point. The term "axial" as used herein refers to a direction or position along an axis that is parallel to a main or longitudinal axis of a transmission or variator. For clarity and conciseness, at times similar components labeled similarly (for example, elements 1A and elements 1B) will be referred to collectively by a single label (for example, elements 1).

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs described herein may operate in both tractive and frictional applications. For example, in the embodiment where a CVT is used for a bicycle application, the CVT can operate at times as a friction drive and at other times as a traction drive, depending on the torque and speed conditions present during operation.

Embodiments disclosed herein are related to the control of a variator and/or a CVT using spherical planets, each planet having a tiltable axis of rotation (sometimes referred to herein as a "planet axis of rotation") that can be adjusted to achieve a desired ratio of input speed to output speed during operation. In some embodiments, adjustment of said axis of rotation involves angular misalignment or displacement of the planet axis in a first plane inducing an unbalanced set of forces on the planets which forces then tend to steer the planets and their respective axles to a new tilt position (or gamma angle) where the forces are then balanced in equilibrium, thereby achieving an angular adjustment of the planet axis of rotation in a second plane, thereby adjusting the speed ratio of the variator. The angular misalignment, rotation or displacement in the first plane is referred to herein as "skew" or "skew angle." A control system coordinates the use of a skew angle to generate forces between certain contacting components in the variator that will tilt the planet axis of rotation in the second plane to a state of equilibrium, where forces on the planet and axles are balanced at the new tilt angle. The tilting of the planet axis of rotation adjusts the speed ratio of the variator. Embodiments of skew control systems (sometimes referred to herein as "skew based control systems") and skew angle actuation devices for attaining a desired speed ratio of a variator will be discussed.

Embodiments disclosed herein may incorporate the advantages and features of ball planetary type CVTs. FIGS. 1, 2A and 2B depict one embodiment of a ball planetary type continuously variable transmission (CVT) 10 having a plurality of planets 11 arranged around main axle 12 defining longitudinal axis 13. Each planet 11 rotates about its own planet axle 15 defining planet axis of rotation 16. Sun assembly 18 is located radially inward of and in contact with each planet 11. Assuming, for FIGS. 1 and 2A-2B, power flows from right to left, CVT 10 further includes traction ring 26 for transferring power to planets and traction ring 28 for transferring power from planets 11, including to or from sun 18. CVT 10 may further include axial force generators 5, 6, as well as sensors, lubrication components, traction fluid, additional toothed gear sets, etc., which are not shown. In some embodiments, each planet axle 15 has an axle cap 44 for rolling contact with surfaces 37, 38 (see FIG. 3) of stator slot 31 in input stator 32, and timing plate roller 43 (see FIGS. 4A and 4B) for rolling contact with surfaces 45, 46 of timing plate 36.

Control of planet axles 15 (and therefore axes of rotation 16) may be accomplished using input stator 32, output stator 34 and, in a passive role, the timing plate 36. In general, planets 11 are interposed between input stator 32 and output stator 34, with timing plate 36 being positioned proximate input stator 32 (as depicted in FIGS. 1, 2A and 2B) or output stator 34 (not depicted). Planet axles 15 are positioned such that first end 15A is located within stator slots 31 in input stator 32 and second end 15B is located within stator slots 33 in output stator 34. Rotation of one of input stator 32 or output stator 34 relative to each other by a certain beta angle will result in a skew angle between planet axle 15 and longitudinal axis 13. Thus, as CVT 10 is adjusted in the range between full under drive (FUD) and full overdrive (FOD), slots 31 and 33 are angularly misaligned and ends 15A and 15B of planet axles 15 translate along slots 31, 33. In other words, the input stator 32 and output stator 34 actively skew an end of all of the planet axels 15 out of parallel with longitudinal axis 13 and the forces acting on the planets 11 from the input ring 26, output ring 28 and sun assembly 18, tend to tilt or steer the planet axles 15 to a tilt angle (gamma angle) where the forces acting on the planets 11 are balanced for the selected skew angle (beta angle) between input stator 32 and output stator 34. The timing plate 36 does not determine the tilt angle of the planet axles 15, as "iris plates" in other CVTs may do and does not actively participate in shifting the CVT 10. Rather, the timing plate 36 serves the limited function of preventing the axles 15 from misaligning too far from one another when the CVT 10 is in certain conditions, such as during reverse operation.

When a CVT is operating near the middle of its range (such as depicted in FIG. 1), adjusting the transmission ratio is rapid and requires little effort. However, FIGS. 2A and 2B depict cross-section views of a CVT, illustrating the concepts of under drive and over drive. When CVT 10 is in under drive, planet axle 15 is at a tilt angle such that the input speed (observed at input traction ring 26) is greater than the output speed (observed at output traction ring 28) and the input torque is proportionately less than the output torque. When CVT 10 is in over drive, planet axle 15 is at a tilt angle in an opposite direction such that the input speed (observed at input traction ring 26) is less than the output speed (observed at output traction ring 28) and the input torque is greater than the output torque. A concern of CVT design is decreased performance and damage caused by binding, which may occur when the CVT is at or near FUD or FOD and the transmission is rotating below a desired speed.

FIG. 3 is a side view of a stator, illustrating areas of concern when the CVT is operating at an extreme tilt angle (such as FUD or FOD) in a forward direction. For ease of understanding, only stator 32 is depicted. However, the concepts described herein may apply to either stator 32 or stator 34. When input stator 32 of CVT 10 is rotating counterclockwise, planet axles 15 may contact surfaces 37 of slots 31 in input stator 32. When stator 32 is rotating clockwise, planet axles 15 may contact surfaces 38 of slots 31 in stator 32. It should be noted that, due to tolerances, variations in manufacturing, wear or other factors, not all axles 15 may be in contact with the same respective surface. Using stator 32 depicted in FIG. 3, there may be six slots 31, whereby five planet axles 15 may contact five of the six surfaces 37 and one planet axle may contact surface 38.

When planet axles 15 are parallel with, or within a range to (near) parallel with, a longitudinal axis of the CVT 10, adjustment of the axles may be performed independent of any rotational speed or torque of the transmission. However, if planet axles 15 are tilted to a terminus of the overall range of the transmission, axle ends 15A or 15B may egress or partially egress stator slots 31. If planet axle ends 15A or 15B egress or partially egress stator slots 31 or 33, binding can occur and/or damage may occur to planet axles 15, surface 37 or 38 of slot 31, area 55, or some other portion of stator slot 31 or 33 or stator 32 or 34. In one scenario, when a bicycle is operating at FOD and the rider is not applying power (e.g., such as when traveling down a hill, traveling with a strong tailwind, coasting, etc.), planet axles 15 may be tilted to an angle such that egress of the planet axle 15 is possible near area 57.

Figure 4A:
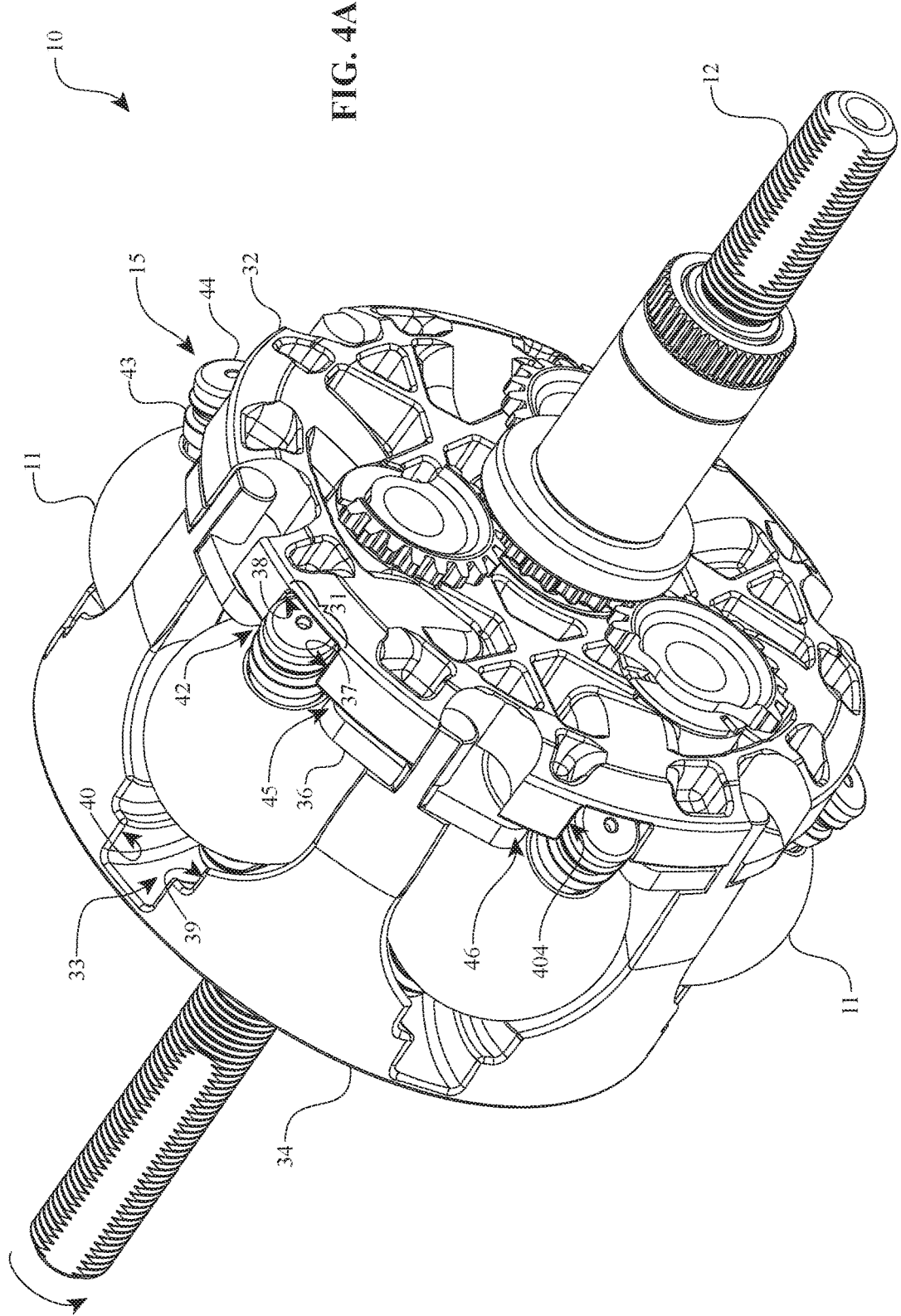
FIGS. 4A and 4B depict perspective views of one embodiment of a CVT at FOD, illustrating how planet axles risk egression from stator slots.
Figure 4B:
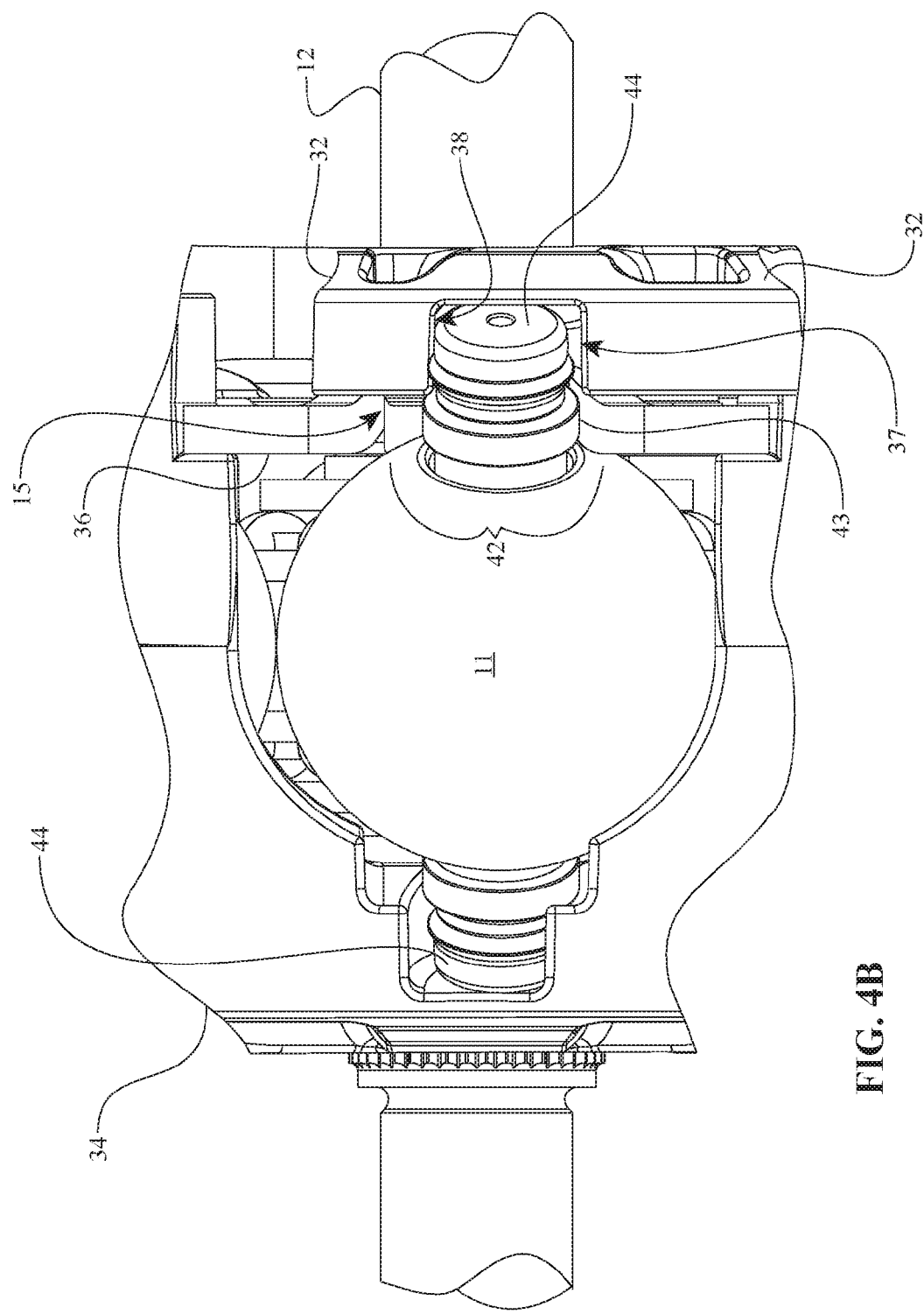

FIGS. 4A and 4B depict perspective views of one embodiment of CVT 10 at FOD, illustrating how planet axles 15 in CVT 10 may risk egression from slots 33.

Binding behavior may be compounded by the design of timing plate slots. For example, depending on the CVT speed, the tilt angle of planet axles 15, and the design of timing plate 36, timing plate 36 may assist with adjusting the speed ratio. However, under certain operating conditions, timing plate 36 can interfere with adjustment such that area 55 may experience increased wear and fatigue, which can lead to fractures or failure. For example, if a rapid adjustment is instigated while system is in FOD (i.e. planet axles 15 are tilted to an extreme angle), timing plate roller 43 may be in close proximity to the relatively large radius on the opening of timing plate slot 42 at the same time axle cap 44 is against the opposing surface 39 or 40 of stator slot 33. The direction of the normal force acting on timing plate roller 43 biases CVT 10 toward increasing the tilt angle (gamma angle) instead of decreasing it as commanded. Furthermore, axle cap 44 may contact a bottom of the stator slot 33 and cause axle 15 to translate axially to try to achieve a zero skew condition. This axial movement sets up a condition that allows timing plate roller 43 to begin edge loading an outer edge of stator 32 near stator slot 31. Depending on the speed of the adjustment ratio and the amount of adjustment force available, axle cap 44 may exert a force on surface 39 or 40 near the outer diameter of stator slot 33. The force may increase friction, thereby increasing heat or generating vibration which has the potential to damage surface 37, 38, 39 or 40. Application of a torque to an input driver may unbind the CVT 10. However, a damaged surface increases the possibility of trapping one end 15A or 15B of planet axle 15 against other components. A sudden load on the input driver could cause further damage resulting in breaking a carrier or some other damage to the carrier, planet axles 15 or some other component.

To overcome the shortcomings of previous approaches and to generally improve the performance of such CVTs 10, embodiments disclosed herein utilize mechanical configurations and geometries (each of which is individually capable of preventing binding) in conjunction with a control system to prevent binding. Particularly, embodiments disclosed herein include arrangements and configurations to prevent axles 15 from egressing or partially egressing stator slots 31, 33 or damaging components.

Input stator 32 and output stator 34 generally do not experience equivalent torques and stresses at the extreme angles associated with FOD and FUD. As such, design for input stator 32 to accommodate planet axles 15 at FUD or FOD may differ from the design for output stator 34 to accommodate planet axles 15 at FOD or FUD.

Figure 5:
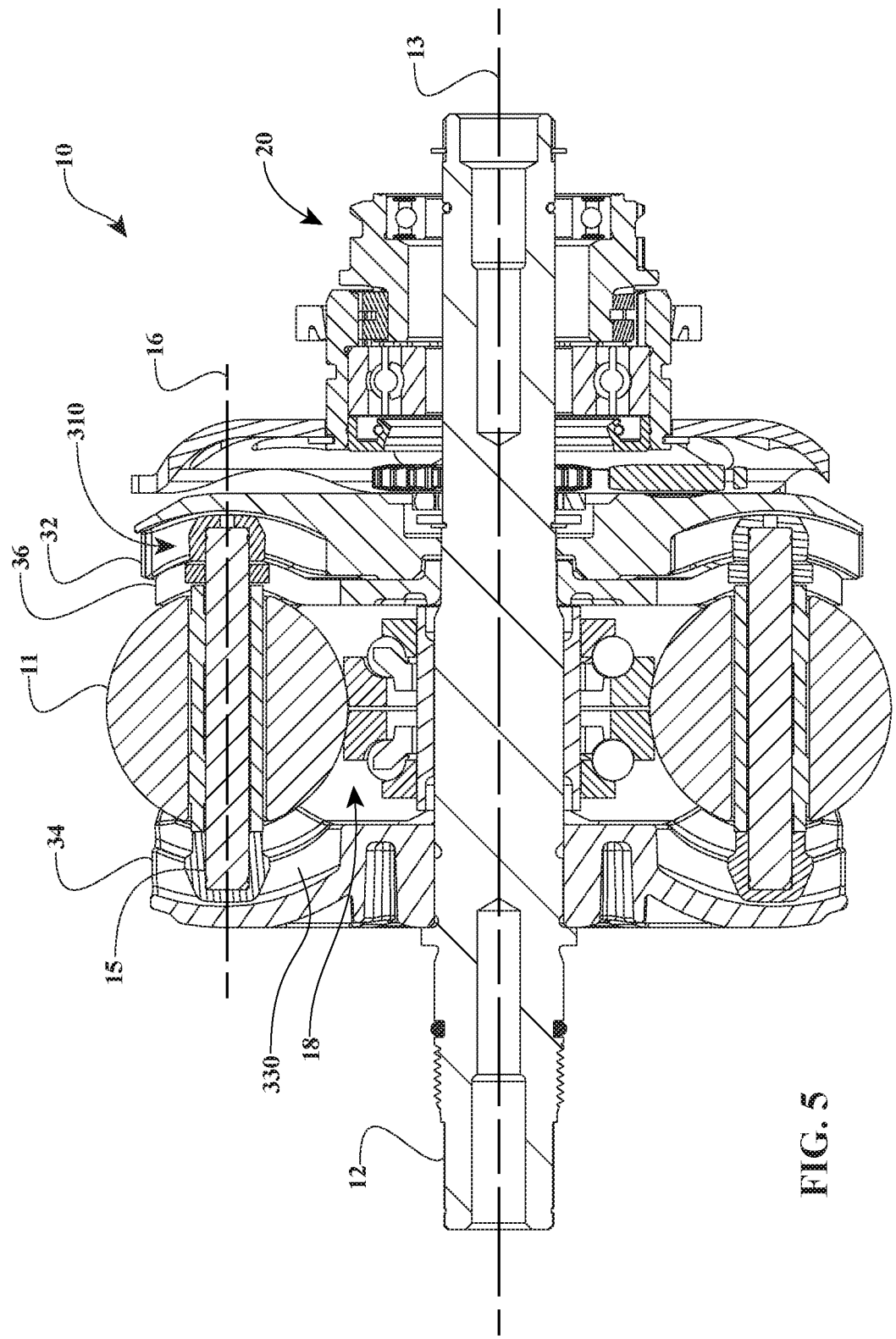
FIG. 5 depicts a view of CVT having an input stator with an outer diameter greater than an outer diameter of an output stator.
Figure 7A:
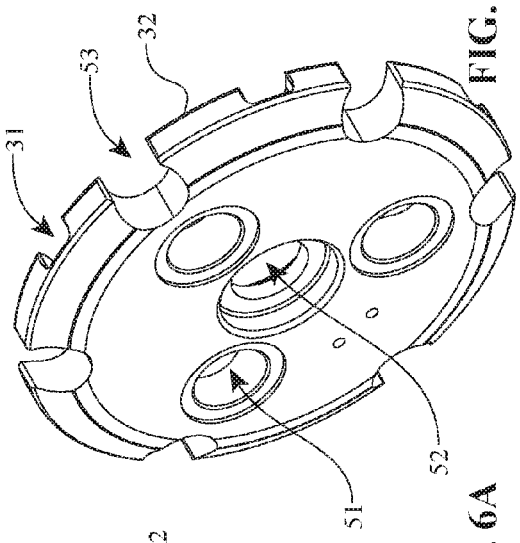
Figure 8A:
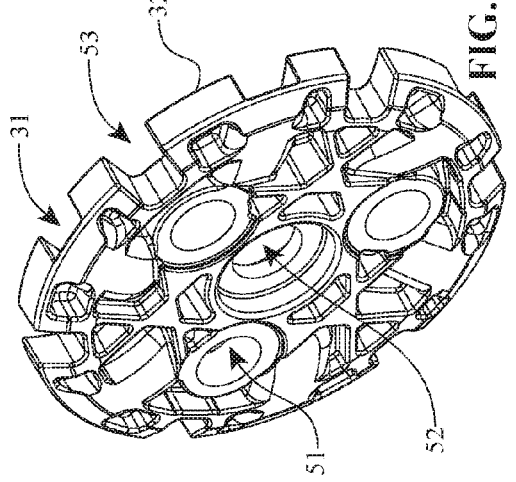

In some embodiments, input stator 32 may be formed to have a larger diameter than output stator 34 such that slots 31 may be longer to provide the full range without risk of axle 15 egressing stator slot 31. As depicted in FIG. 5, CVT 10 may be formed having input stator 32 with an outer diameter greater than an outer diameter of output stator 34. In some embodiments, input stator 32 may be formed with slots 31 recessing radially inward (i.e., deeper) relative to slots 33 in output stator 34. Forming stator 32 with stator slots 31 oversized ensures axle ends 15A cannot egress stator slots 31. Embodiments disclosed herein may realize the same size, weight or inertia benefits of larger CVTs by using stator 32 having a larger diameter. It should be noted that embodiments disclosed herein may achieve the power capacity and range of larger CVTs through various geometries of selected larger parts. Furthermore, embodiments disclosed herein allow users to manually control a CVT as well as provide for automatic adjustment of a CVT without fear of the CVT binding.

Figure 6A:
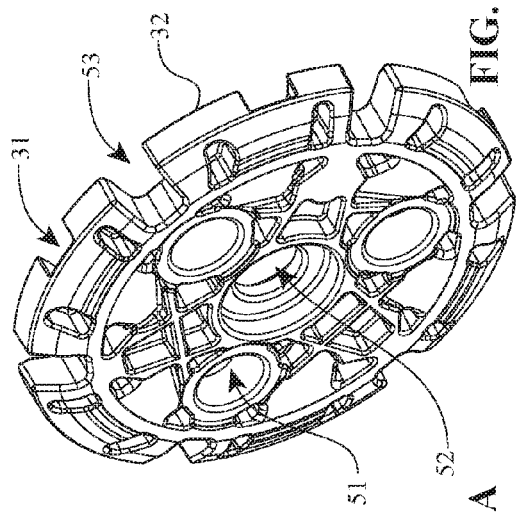
FIGS. 6A-6B, 7A-7B, and 8A-8B depict embodiments of an input stator, illustrating stator slots of different radial dimensions for various CVT configurations.
Figure 6B:
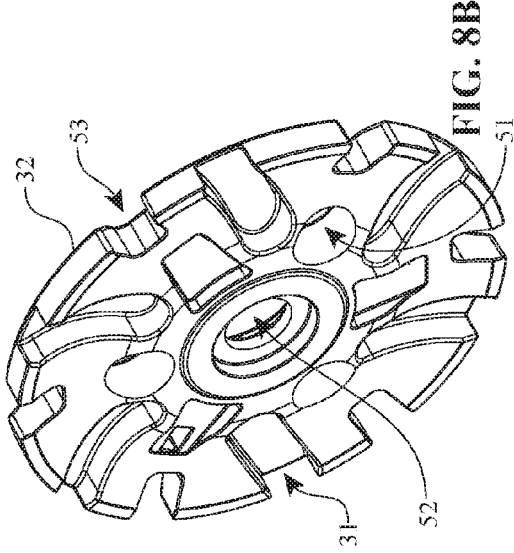
Figure 7B:
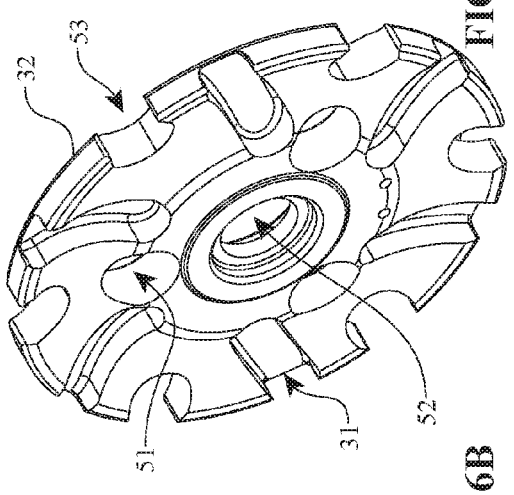
Figure 8B:
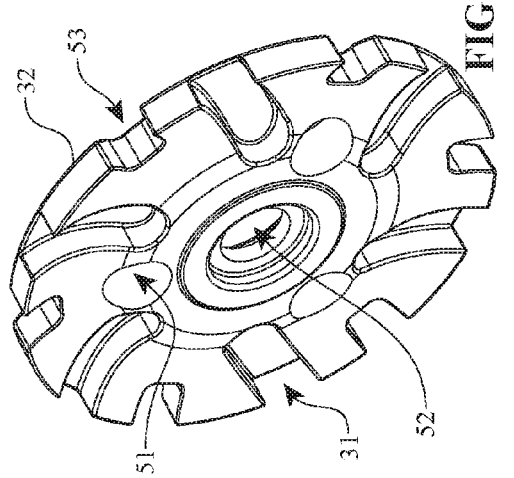

FIGS. 6A-6B, 7A-7B, and 8A-8B depict embodiments of input stator 32 having stator slots 31 of different radial dimensions, illustrating designs for various CVT configurations. As depicted in FIG. 6B, input stator 32 may have slots 31 recessed radially inward to a first radius. As depicted in FIGS. 7B and 8B, input stators 32 may have a larger outer diameter and may have stator slots 31 recessed radially inward to a second radius less than the first radius such that the stator slots 31 extend farther radially inward than stator slots 33. It should be noted that stators 32 depicted in FIGS. 7A-7B or 8A-8B are not just scaled versions of stator 32 depicted in FIGS. 6A-6B. For example, the diameter of central bore 52, the placement and size of openings 51 relative to central bore 52, the radial distance to cutouts 53, or other structures may not change regardless of the outer diameter of input stator 32. In other embodiments, central bore 52, the placement and size of openings 51 relative to central bore 52, and the radial distance to cutouts 53 may not change but other structures such as ribs, shoulders, cutouts, fillets or the like may change to accommodate possible changes in stress.

Figure 9B:
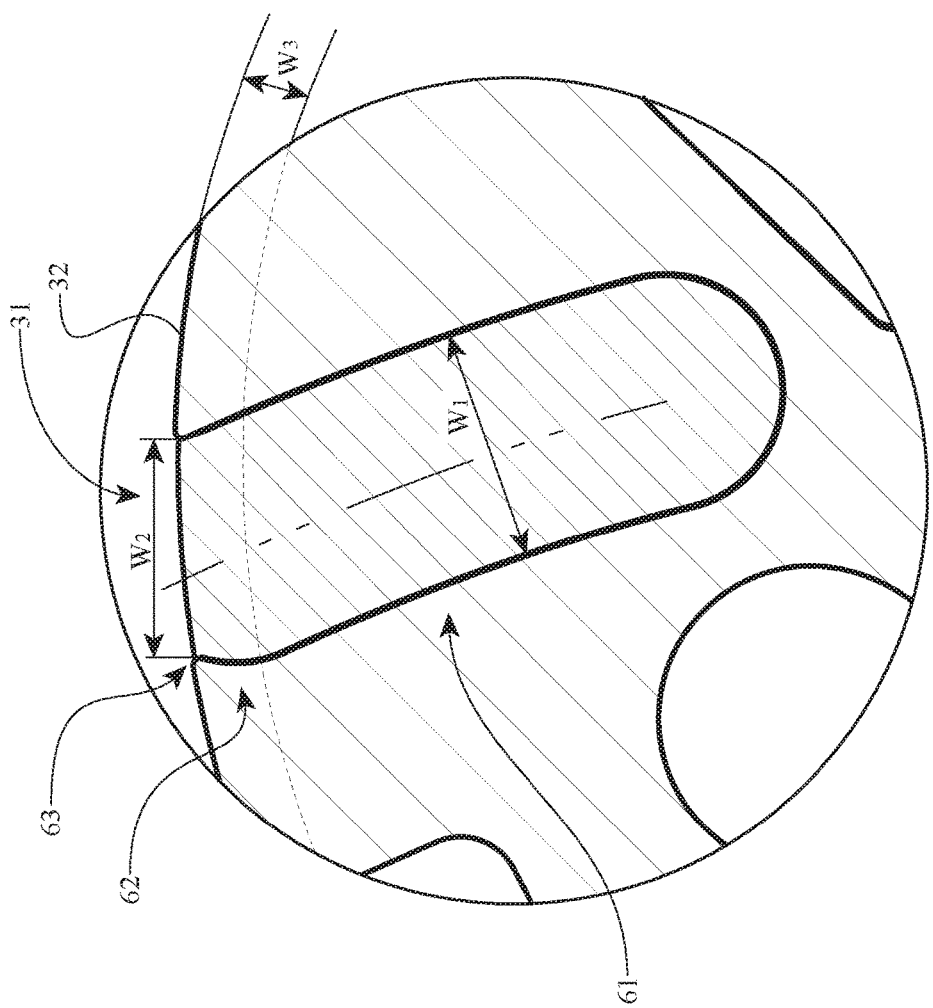
FIGS. 9A and 9B depict partial views of a stator, illustrating stator slots formed as open-ended slots to allow for the greatest range of speed ratios and with features to inhibit egression of axle ends.
Figure 9A:
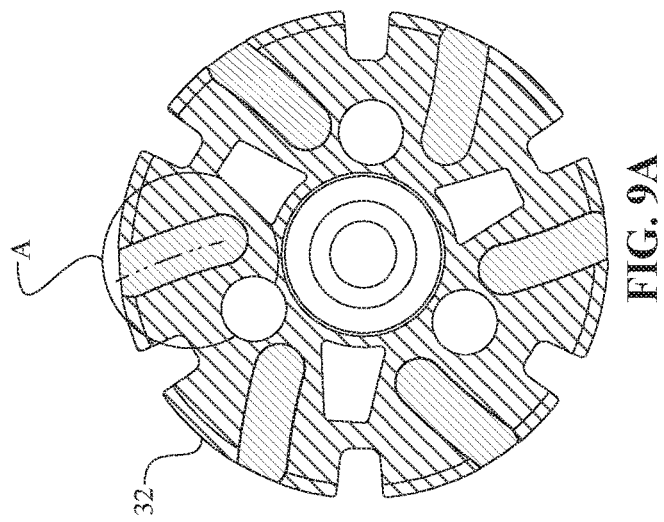

If slots 31 or 33 are formed as closed-end slots, axle ends 15A or 15B cannot egress, but the operating range of CVT 10 may be reduced. In some embodiments, a profile of stator slots 31 or 33 may be configured as open-ended slots to allow radial translation of axle ends to achieve a desired range of speed ratios, but prevent axle ends from egressing stator slots 31 or 33. As depicted in FIGS. 9A and 9B, stator slots 31 or 33 may be formed as open-ended slots to allow for the greatest range of speed ratios, with outer portion 62 being narrower than inner portion 61 to inhibit egression of axle ends. Inner portion 61 may be formed with a first width $W_1$ to allow free translation of axle ends 15A or 15B (including axle cap 44 if present) across a desired operating range. Outer portion 62 may be formed with a second width $W_2$ less than the first width $W_1$. In some embodiments, the second width $W_2$ is less than the diameter of axle end 15A or 15B. In some embodiments, the second width $W_2$ is less than a diameter of axle cap 44. In some embodiments, such as depicted in FIGS. 9A and 9B, slot 31 includes protuberance 63 on leading edge 37 to form the second width $W_2$. Protuberance may be formed with radially inward surface having substantially the same radius of curvature as a radius of planet axle 15 or axle cap 44 to allow for the greatest translation of planet axle 15 (and hence greatest operating range of CVT 10). In other embodiments, stator slot 31 may be formed with protuberance 63 on a trailing edge (not shown) or a combination of two protuberances 63, one on each edge. Furthermore, FIGS. 9A and 9B depict protuberance 63 having a smooth or continuous transition between the first width $W_1$ and the second width $W_2$. Any transition between the first width $W_1$ and the second width $W_2$ may be curved, slanted or stepped.

Figure 10:
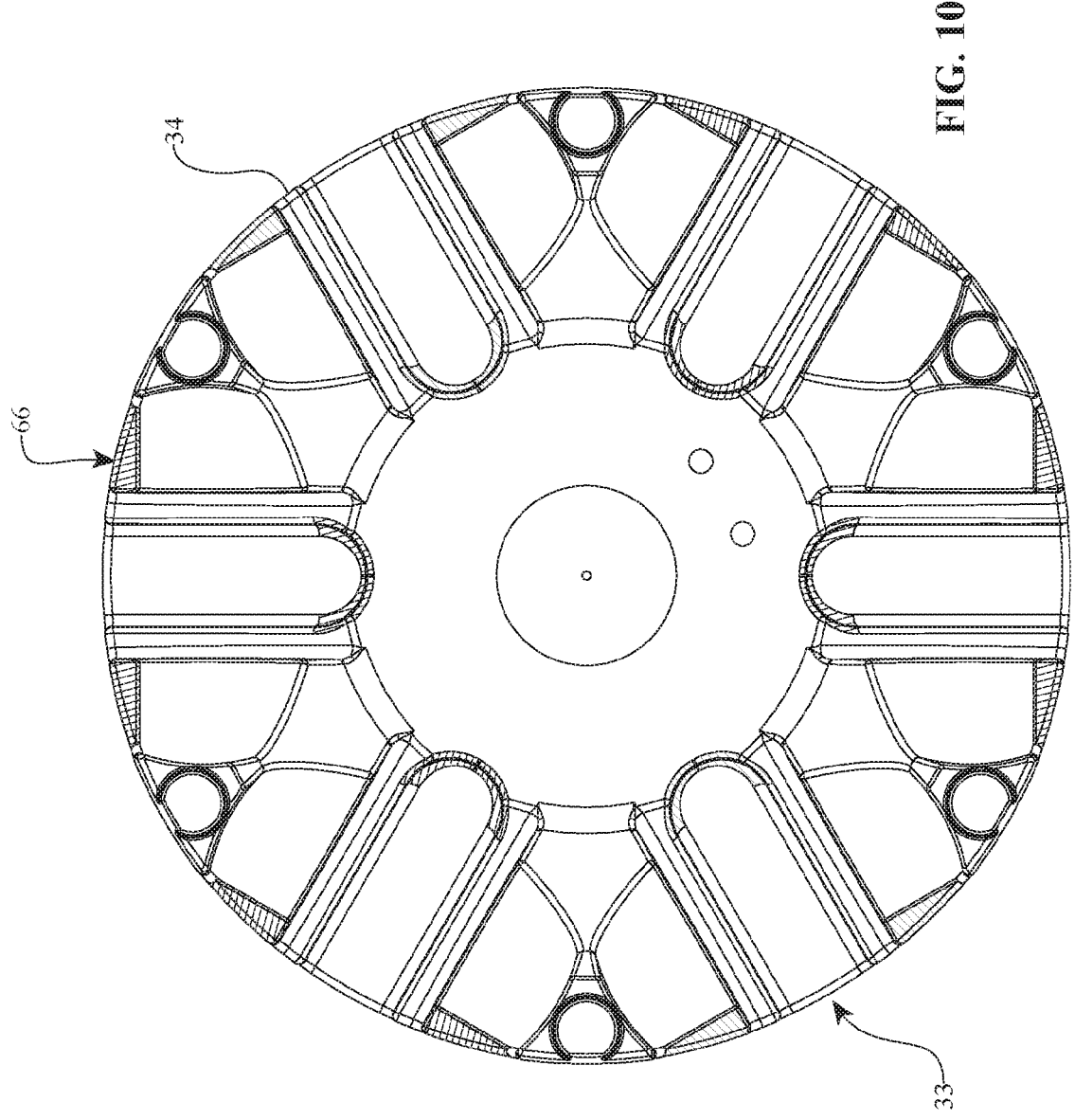
FIG. 10 depicts a side view of one embodiment of an output stator.

FIG. 10 depicts a side view of output stator 34. In some embodiments, output stator 34 may be used in assemblies having larger assembly tolerances. Output stator 34 may be formed with asymmetric edges to provide additional tolerances for assembly. For example, FIG. 10 depicts one embodiment of output stator 34 having a non-tangential edge 66 proximate the radial outward ends of one, multiple or all of the stator slots 33. Non-tangential edges 66 may be slanted or curved such that the edge 66 is substantially not equal to a radius. Non-tangential edges 66 may be formed during a casting process or may be formed by cutting or otherwise removing material from output stator 34. The angle at which non-tangential edge 66 is formed is based on several factors, including, but not limited to, the dimensions of planet axle 15 (including the presence or absence of axle cap 44 or timing plate roller 43), the dimensions of stator slot 31, and the dimensions of timing plate 36. In some embodiments, non-tangential edges 66 may be formed at an angle greater than 3 degrees relative to a tangent of the circumference of stator 34 at the centerline of slot 33. In some embodiments, an angle greater than 6 degrees may be necessary to provide clearance for planet axle 15 to be positioned in CVT 10 with axle ends 15A and 15B in stator slots 31 and 33.

A timing plate is another component which ideally improves performance of a CVT but, under certain circumstances, has the capability to hinder performance or even cause binding or damage to the CVT. Timing plate 36 does not play an active role in the shifting of CVT 10, as stator slots 31, 33 are the primary guides for axles 15, but it may be used to limit the error in the tilt angle any single planet axle 15 may have in relation to the mean tilt angle of remaining planet axles 15. Timing plate 36 is particularly useful when torque is driven backward through CVT 10, whereby timing plate 36 prevents a binding situation from occurring due to variations in offset of axles 15. Timing plate 36 may be a free turning disc with radial guide slots 45, and may be placed axially between or outside stator discs 32, 34. Timing plate 36 may be grounded with a direct coupling to either stator disc 32, 34 or via an element (not shown) that is also grounded relative to stator disc 32 or 34. In some embodiments (not shown) timing plate 36 may be counter-timed to stator disc 32 or 34 to which it is adjacent by a gear mechanism coupling it to relative stator disc 32, 34. Each of planet axles 15 extends through slots 45 of timing plate 36 and engages stator guide slots 31, 33. Tolerances of timing plate slots 45 allow stator guide slots 31, 33 to be the primary alignment feature for planet axles 15.

Figure 11B:
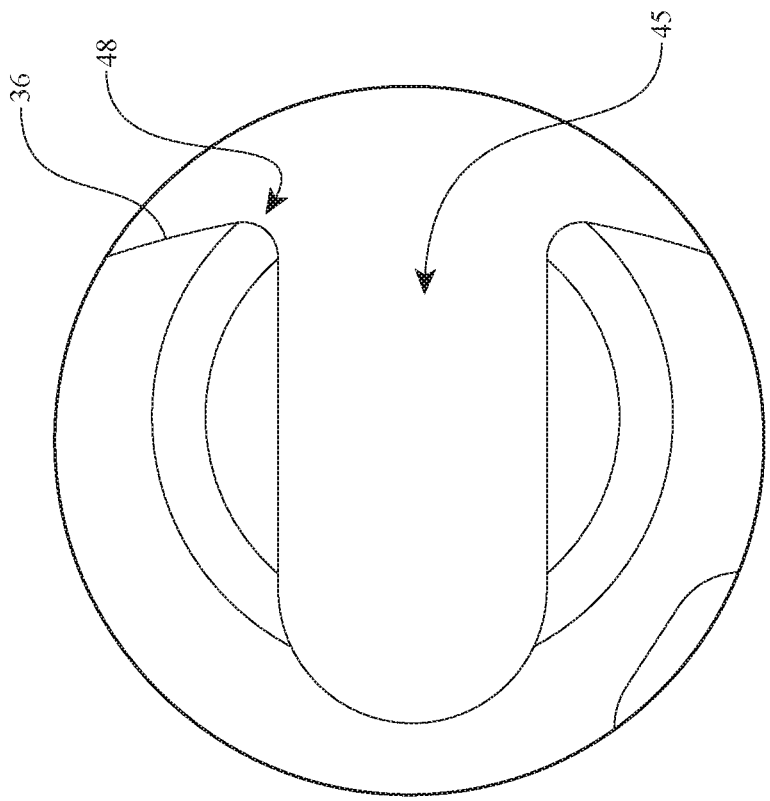
FIG. 11B depicts a close up partial side view of one embodiment of a timing plate.
Figure 11A:
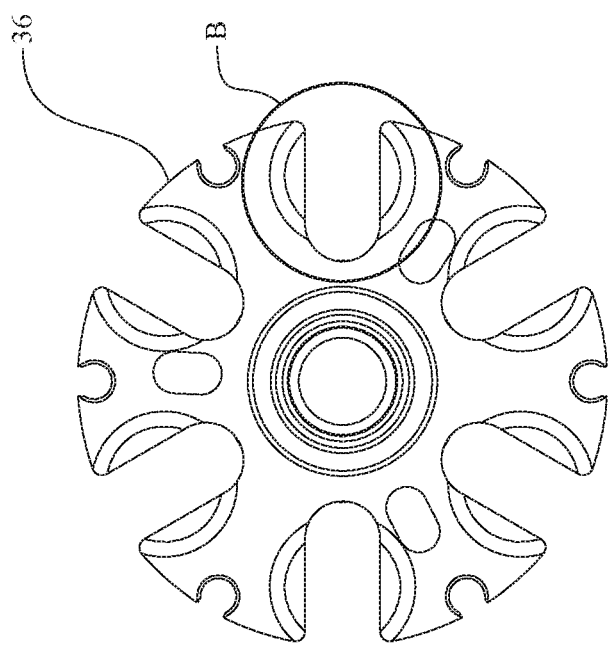
FIG. 11A depicts a view of one embodiment of a timing plate.

FIG. 11A depicts a side view of one embodiment of a timing plate 36, and FIG. 11B depicts a close up partial side view of timing plate 36. Timing plate 36 has timing plate slots 45 configured to cooperate with stator slots 31, 33 to control planet axles 15. However, when an axle end 15A or 15B is near a radially outward end of stator slot 31 or 33, there exists a possibility that forces applied by timing plate slot 45 may bias axle 15 out of stator slot 31 or 33. In some embodiments, timing plate slots 45 are formed with a reduced radius of corner 48. Reducing a corner radius of slots 45 may ensure planet axles 15 do not roll up and over corner 48, that is, they do not egress from slot 45, which may prevent axle cap 44 from edge loading stator slots 31 or 33.

At zero planet speed, no skew forces can be generated to induce a change in the gamma angle. As the beta angle (that is, the relative angular position of one stator disc 32, 34 with respect to the other) changes, planet axles 15 skew until timing plate roller 43 contacts timing plate slots 45, creating a scissoring action on planet axle 15. If the friction forces are high enough, planet axle 15 cannot slide along the scissoring faces (i.e., surfaces 37, 38 or 41), causing CVT 10 to bind. Timing plate slots 45 may be polished or otherwise have a surface finish to reduce friction. Reducing friction in timing plate slots 45 reduces the possibility for binding. In some embodiments, slots 45 may be machined, polished or otherwise formed to have a surface finish less than a surface finish of stator slots 31 or 33. For example, timing plate 36 may be formed with timing plate slots 45 having a surface finish less than 2 nanometers, less than 1.5 nanometers, or less than 1.2 nanometers.

In addition to CVT design, the rotation speed of planets 11 may affect binding. For example, the friction forces present at times in a skew control system, the geometry of a stator or timing plate, the friction force between an axle end in contact with a stator or timing plate, and the like can cause binding at or near zero speed. Embodiments disclosed herein may also control adjustment rate, which may eliminate such binding.

In an asymmetric skew system, any one or a combination of traction forces, forces on the axle ends and ring rotation produce a gamma adjustment rate. If the system skews without input torque or rotation the planet axle will skew with no gamma adjustment. The adjustment system can bind once the timing roller contacts the timing plate due to friction forces and lack of gamma adjustment forces. Binding can also occur at low speeds when little or no torque is applied for same reason. The rate at which a gamma angle can change is directly related to planet speed and the torque on rings 26, 28. The more the gamma angle lags behind the beta angle, the possibility for binding increases. In some embodiments, to minimize contact of the timing roller with the timing plate, the beta adjustment rate needs to closely match gamma adjustment rate.

Figure 12:
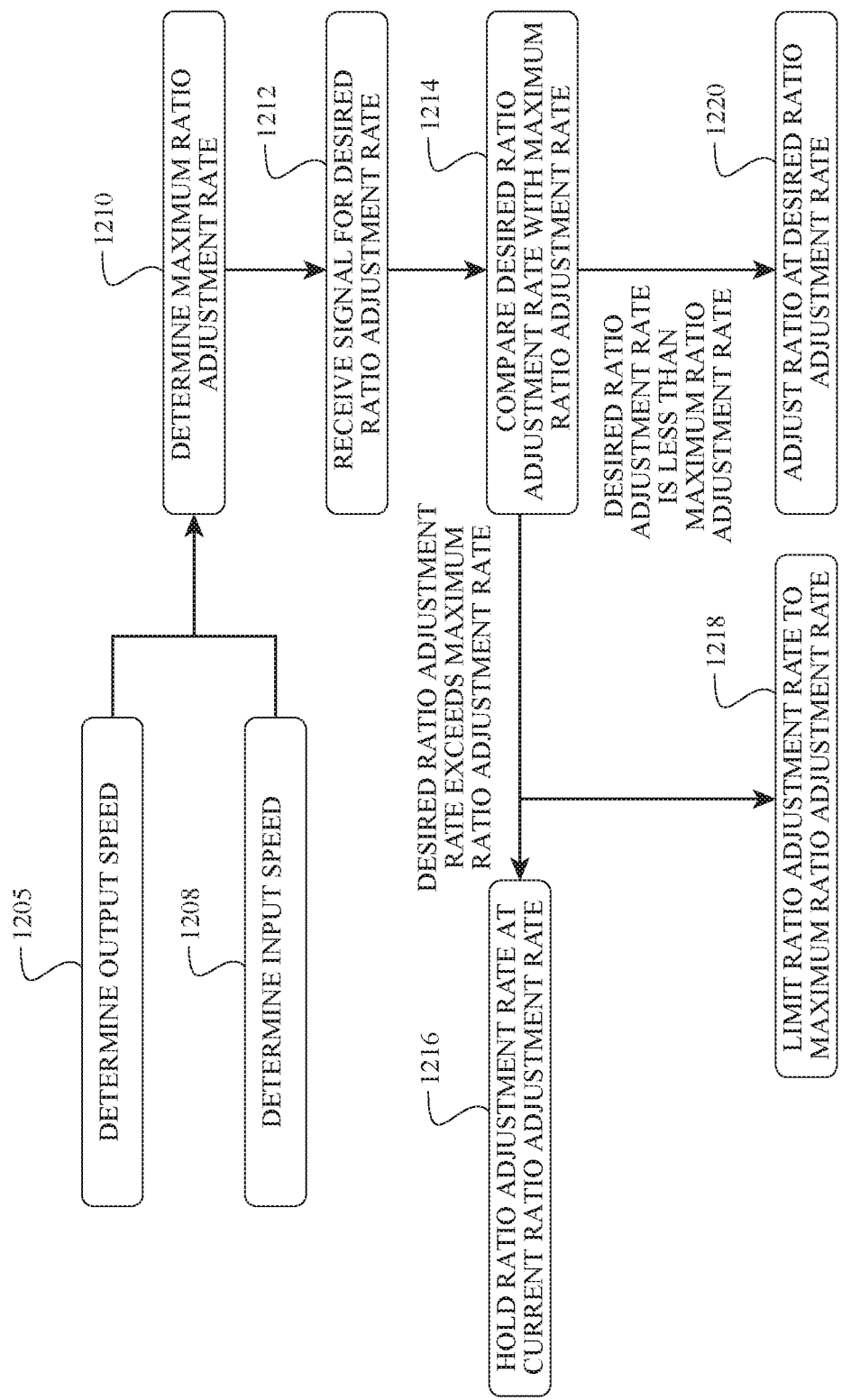
FIG. 12 depicts a flow diagram, illustrating one method for controlling a ratio adjustment rate.

A position controller may be implemented to adjust CVT to a desired beta angle. The controller may apply a torque to a driver to achieve a specific beta angle. The torque applied may be limited to a motor stall torque. Beta stops may be added to limit the beta angle. In some embodiments, beta stops may be implemented to limit the beta angle to an angle between −5 degrees to +6 degrees. Embodiments may include firmware or some other tangible medium including a memory, a processor and a set of instructions for controlling a ratio adjustment rate. FIG. 12 depicts a flow diagram, illustrating one method for controlling a ratio adjustment rate.

In steps 1205 and 1208, input and output speeds related to CVT 10 are determined from sensors.

In step 1210, a maximum ratio adjustment rate is determined. Determining the maximum ratio adjustment rate may be achieved by an algorithm using input signals from various sensors to calculate a theoretical maximum ratio adjustment rate, may be achieved by empirical testing and subsequent storage of the predicted maximum ratio adjustment rate into a table, or some combination.

In step 1212, a desired ratio adjustment rate is determined, such as by receiving a signal from a controller. In some embodiments, a user may twist a hand grip or otherwise try to manually impose a desired ratio adjustment rate. A sensor may determine the desired ratio adjustment rate based on the angular displacement of the hand grip.

In step 1214, the desired ratio adjustment rate is compared to the maximum ratio adjustment rate. The maximum adjustment rate may be stored in memory or may be calculated continuously.

In step 1216, if the desired ratio adjustment rate is greater than the maximum ratio adjustment rate, the ratio adjustment rate is held at the present ratio adjustment rate. Alternatively, in step 1218, if the desired ratio adjustment rate is greater than the maximum ratio adjustment rate, the ratio adjustment rate is adjusted to be approximately equal to the maximum ratio adjustment rate.

In step 1220, if the desired ratio adjustment rate is less than the maximum ratio adjustment rate, the ratio adjustment rate is adjusted to the desired ratio adjustment rate.

Figure 13B:
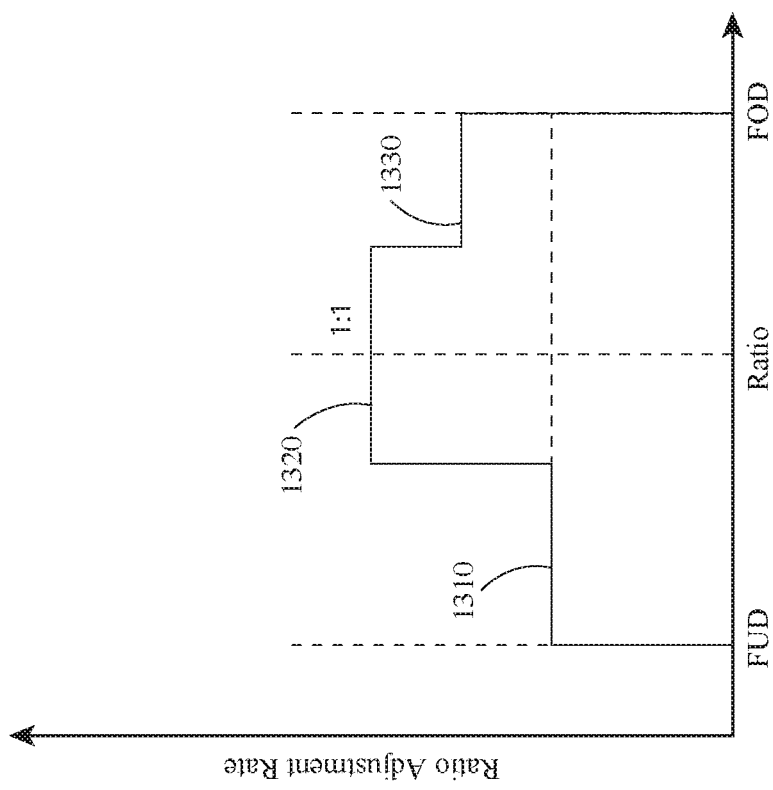
FIGS. 13A-13D depict graphs, illustrating methods for storing information related to the control of a CVT to prevent binding and to optimize performance at all speed ratios.
Figure 13A:
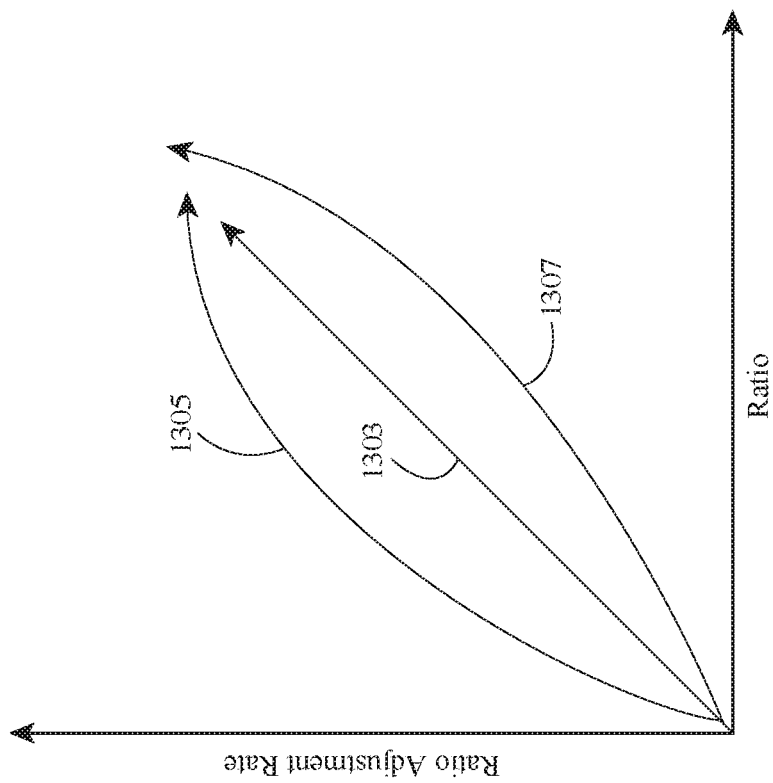
Figure 13C:
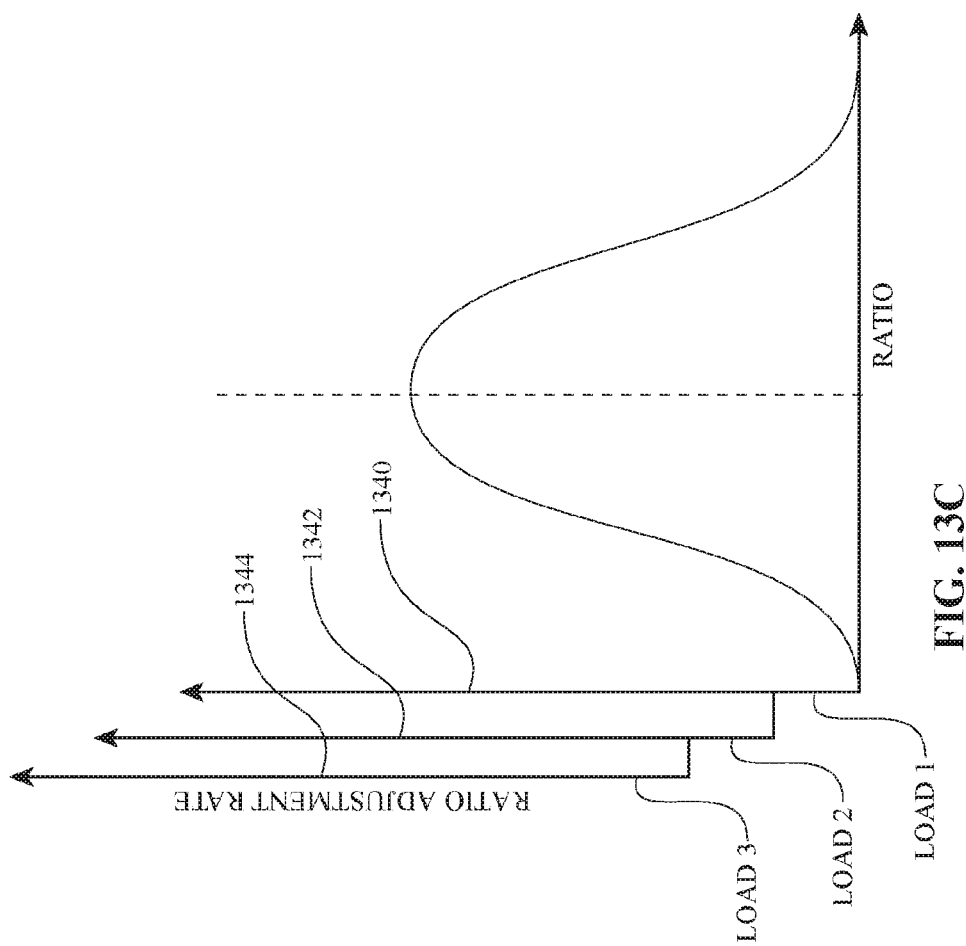
Figure 13D:
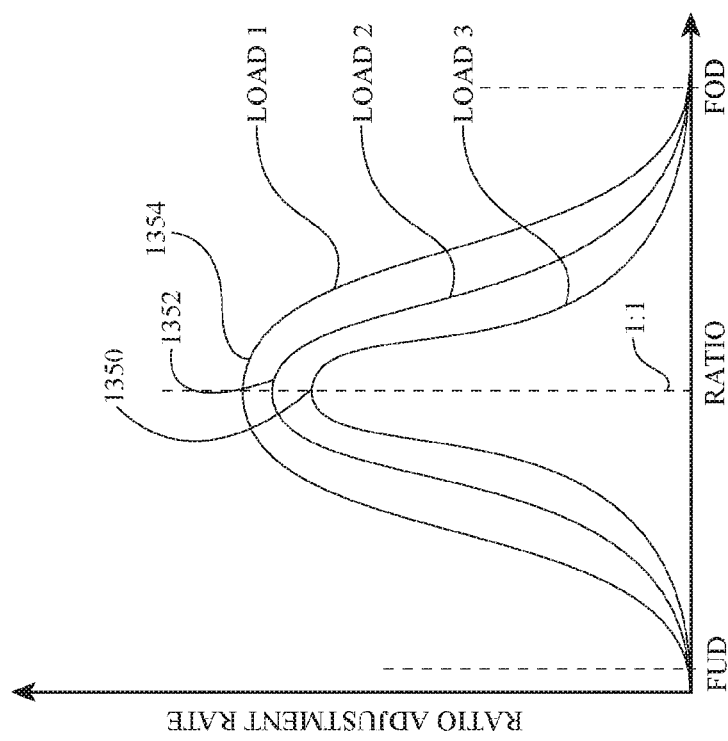

FIGS. 13A, 13B, 13C and 13D depict various solutions for determining maximum ratio adjustment rate. As depicted in FIG. 13A, a maximum ratio adjustment rate may be calculated for a given CVT operating at different ratios. A calculated maximum ratio adjustment rate may be substantially linear, or may be curvilinear, such as an increasing or decreasing ratio adjustment rate. If there is a linear relationship between ratio and ratio adjustment rate, calculation of a ratio adjustment rate may be preferred. If there is a non-linear relationship between ratio and ratio adjustment rate, a look up table to determine a ratio adjustment rate may be preferred. Determination of an adjustment rate may be determined based on a transmission ratio of the CVT. As depicted in FIG. 13B, a ratio adjustment rate corresponds to a transmission ratio. Further, as depicted in FIG. 13B, a maximum ratio adjustment rate may be expressed as a series of ranges. In a first range (from FUD to near 1:1), the maximum ratio adjustment rate may be at a first rate 1310. In a second range (from near 1:1 on an underdrive side of the range to near 1:1 on an overdrive side of the range), the maximum ratio adjustment rate may be at a second rate 1320. In a third range (from near 1:1 to FOD), the maximum ratio adjustment rate may be at a third rate 1330. Furthermore, in some situations or configurations, existence of a binding condition may be dependent on the direction of transmission rotation. A maximum adjustment rate may be determined based on other factors as well. As depicted in FIGS. 13C and 13D, a plurality of data structures may be determined for a plurality of loads. FIG. 13C depicts a plurality of data structures for determining a maximum adjustment rate under different loads. This process may be suited for CVTs or operations in which there is a linear relationship based on loads. FIG. 13D depicts a single data structure storing a plurality of curves. Note that in FIG. 13D, if the CVT has a higher load, it might result in a lower maximum adjustment rate 1350 in a first direction (e.g., going from FUD to FOD) but may result in a higher maximum adjustment rate 1354 in a second direction (e.g., going from FOD to FUD). Alternatively, embodiments may select a hybrid adjustment rate 1352 for both upshifting and downshifting. Thus depending on how much load was being transported, a different table or other data structure may be referenced to determine the maximum ratio adjustment rate.

Figure 14:
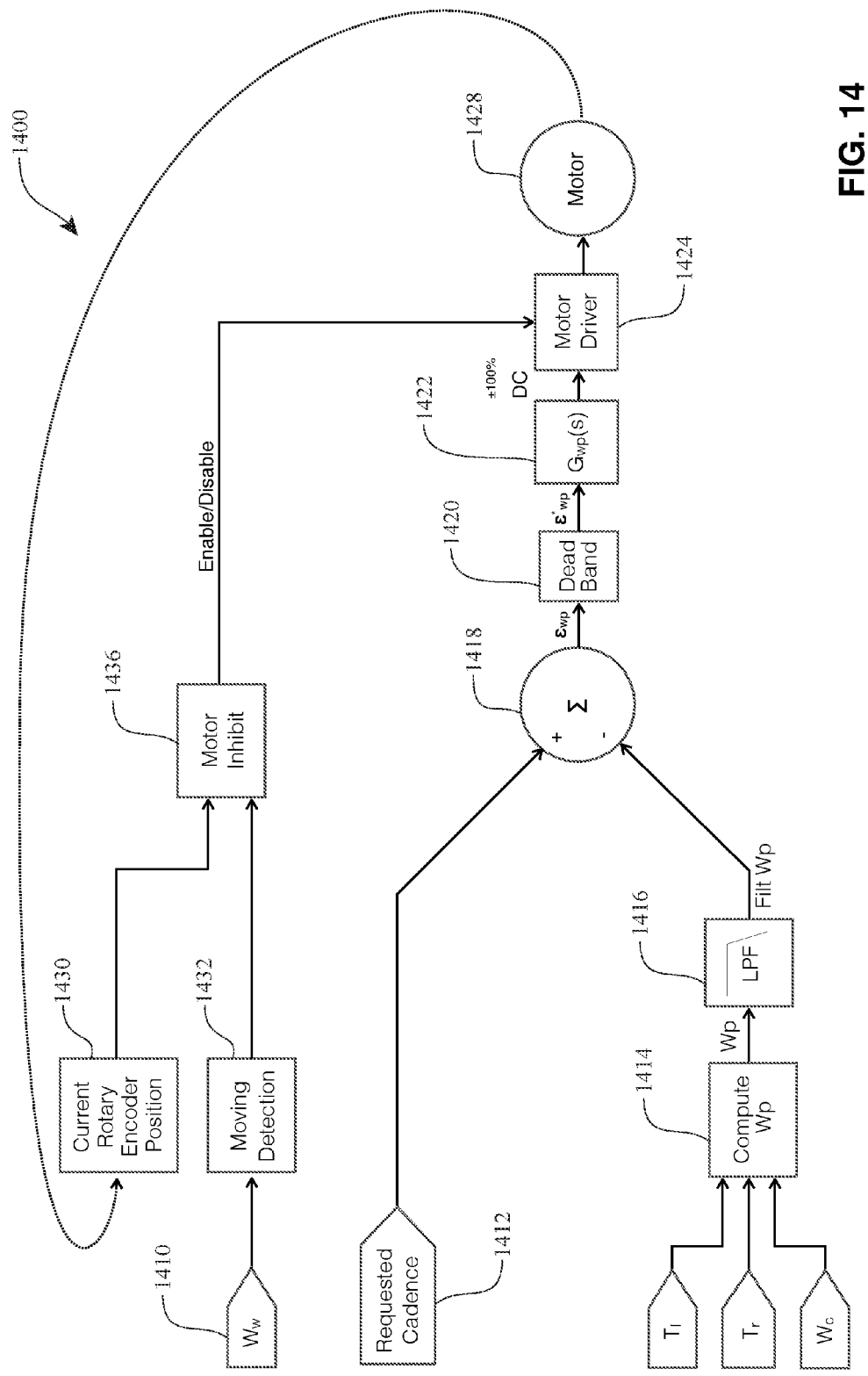
FIG. 14 depicts portions of a system or steps in a control loop useful for operating a transmission when a rider is pedaling and adjustment of the transmission ratio is automatically and continuously controlled by a controller.

Embodiments disclosed herein may implement one or more control strategies depending on a mode of operation. For example, in applications involving bicycles, there may be a first mode of operation when a rider is pedaling the bicycle and a second mode of operation when the rider is not pedaling, or there may be a first mode of operation when the transmission ratio is controlled automatically, such as by a controller determining a target transmission ratio, and there may be a second mode of operation when the user wants manual control of the transmission. FIG. 14 depicts a flow diagram, illustrating a system and method for adjusting a CVT when a rider is pedaling.

Blocks 1410, 1412, 1414, 1416, 1418, 1420, 1422, 1424, 1428, 1430 and 1436 may represent portions of a system or steps in a control loop useful for operating a transmission when a rider is pedaling and adjustment of the transmission ratio is automatically and continuously controlled by a controller.

In step 1410, embodiments may determine whether a bicycle is moving. A wheel speed sensor may be positioned relative either a front wheel or rear wheel on a bicycle. In some embodiments, a mechanical, electric or magnetic (including some variation such as electromagnetic) sensor may provide the wheel speed (referred to herein as $\omega w$ or Ww). In one embodiment, a Hall effect sensor may be used to determine wheel speed. The sensor may be communicatively coupled to a controller. In some embodiments, the sensor may process any signals to determine a wheel speed. In other embodiments, the sensor may provide any signals to the controller and the controller may process any signals to determine a wheel speed.

In step 1412, a cadence may be requested. Requesting a wheel cadence may involve a user requesting a particular cadence or a range of cadences, such as by entering a cadence in a graphical user interface (GUI) communicatively coupled to a controller.

In step 1414, a pedal speed or cadence (referred to herein as $\omega p$ or Wp) may be calculated. Calculating a wheel cadence may involve a controller using the wheel speed (as received from the wheel speed sensor, as determined based on the vehicle speed and the wheel radius, etc.) and a ratio of a front gear relative to a rear gear. In some embodiments, the ratio may be determined based on the number of teeth on a front gear and the number of teeth on a rear wheel, front ring diameter and rear cog diameter, or the like. In some embodiments, cadence ($\omega p$) may be determined based on the following equation:

$$\omega p = \omega c * Tf/Tr$$

where $\omega p$ is cadence, $\omega c$ (or Wc) is the rotational speed of the rear cog, Tf is the number of teeth on a front ring (also commonly referred to as a front crank) and Tr is the number of teeth on a rear ring (also commonly referred to as a rear cog). In step 1416, a calculated wheel cadence value may be passed through a filter such as a low pass filter (LPF).

In step 1418, a value for the requested cadence and the actual cadence can be compared. In some embodiments, a summing function may be used to calculate an error value.

If the error value is non-zero, there is the possibility that the system will continually try to adjust the CVT. This can cause issues, such as increased temperature of a motor or increased battery power consumption by the motor. Embodiments may include additional functions or functionality to refine the signal and improve the system performance. In step 1420, a dead band may be determined. A controller may determine a dead band based on bicycle speed, a requested cadence, a wheel speed, a motor rating, a motor duty cycle, a current draw from a battery, a power input from a battery/motor, or some other factor. In step 1422, any value of cadence that is within the range of values defined by the dead band is changed to 0. Steps 1420 and 1422 may reduce the frequency that a CVT may need to be adjusted, which may increase life of the system, improve range of a battery, increase the life of a component such as a motor, etc. Portions of steps 1420 and 1422 may be performed by a controller.

In step 1424, a motor driver may be operated to achieve the requested cadence. The motor driver may be coupled to a piston, a cam, or some other mechanism for adjusting a transmission ratio of the CVT. In some embodiments, a motor driver may be configured to adjust a tilt angle or a skew angle capable of adjusting a tilt angle. The motor driver may be configured to operate a motor according to a duty cycle. In step 1428, a motor coupled to the motor driver may adjust the transmission ratio of the CVT. The motor driver may provide a signal at a rate between 0 and 100% of a time period. In some embodiments, a rotary encoder position may be adjusted by the motor.

Embodiments may determine when to operate the control system. In step 1410, the wheel speed ($\omega w$) may be determined. A controller may determine if the bicycle is operating above a threshold. For example, a threshold value of 20 revolutions per minute (RPM) may be stored in memory. A moving detection function may receive, intercept, or otherwise obtain a value for present wheel speed ($\omega w$) and compare that value to the 20 RPM. If the present wheel speed is equal to or greater than the threshold value, a signal (e.g. a flag) may be sent to the motor driver, allowing the motor driver to operate the motor. If the present wheel speed value is less than the threshold value, the motor driver is not allowed to operate the motor. In step 1436, a controller determines if the motor driver should be allowed to drive a motor. If the bicycle is determined to be above the threshold, embodiments may employ a second control loop. In step 1430, a present rotary encoder position is determined. A rotary encoder position may be used to determine a beta angle (that is, a relative rotation between two stator discs in a CVT). A beta angle may cause a plurality of axles in a ball planetary CVT to have a skew angle. A skew angle causes the CVT to have a tilt or gamma angle.

Figure 15:
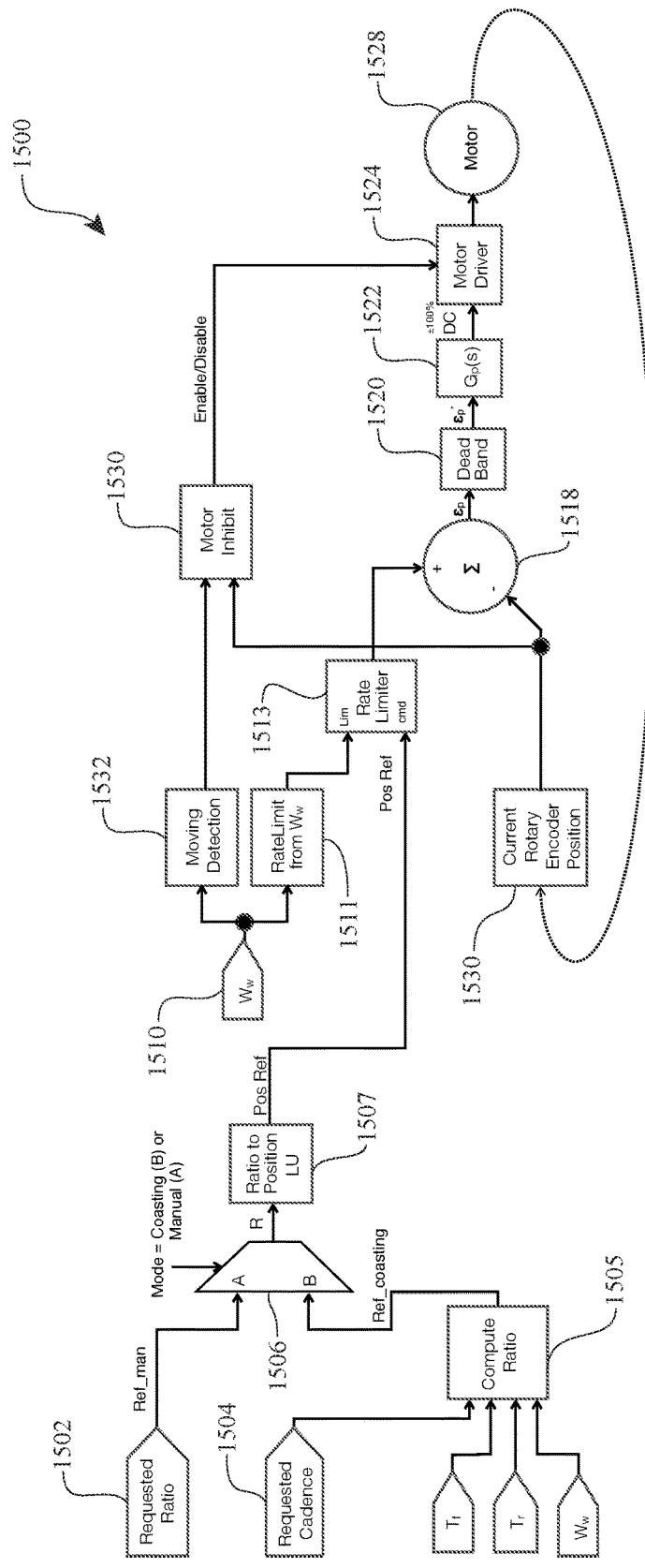
FIG. 15 depicts portions of a system or steps in a control loop useful for operating a transmission according to manual control, and further depicts portions of a system or steps in a control loop useful for operating a transmission according to manual control.

The above steps may be useful for controlling a CVT in a bicycle when a rider is pedaling. However, there are times when a rider is coasting or otherwise not pedaling. This can create scenarios in which a CVT is at a risk for being at an undesirable transmission ratio. For example, a user may be riding at the highest transmission ratio (also referred to as full over drive or "FOD") and then stop pedaling, coasting to a stop. When the user starts to pedal, the CVT could still be at FOD and the torque applied by the rider to accelerate the bicycle will exceed a desired threshold. Accordingly, embodiments disclosed herein may, upon detection that the rider is not pedaling, perform a control scheme capable of adjusting the transmission ratio such that when the user starts pedaling again, the CVT will be in a suitable transmission ratio. Alternatively, a scenario may exist in which a user may want to manually controls the CVT. FIG. 15 depicts a schematic diagram, illustrating a system and method for controlling a transmission ratio of a CVT during coasting or other operations in which the rider is providing minimal (including zero) input power or is manually controlling the transmission ratio.

Blocks 1502, 1506, 1507, 1513, 1518, 1520, 1522, 1524, 1528, 1530 and 1536 may represent portions of a system or steps in a control loop useful for operating a transmission according to manual control.

In step 1502, a requested ratio may be received by a controller. The requested ratio may be input by a user such as by twisting a handle, entering a value using a GUI, pushing a button or other input mechanism.

In step 1506, a controller may receive, request or otherwise obtain information about a requested ratio. In some embodiments, an interface may be configured to receive information and determine from the information that a user is wanting to adjust a transmission manually.

In step 1507, a controller receives information relating to a requested ratio. Using this information, a controller may provide an estimation of a transmission ratio. In systems in which a relationship between a position and a transmission ratio is non-linear, a controller may refer to a lookup table or other data structure stored in memory to provide an estimation of a transmission ratio.

In step 1510, embodiments may determine a bicycle is moving. A wheel speed sensor may be positioned relative either a front wheel or rear wheel on a bicycle. In some embodiments, a mechanical, electric or magnetic (including some variation such as electromagnetic) sensor may provide the wheel speed ($\omega w$). In one embodiment, a Hall effect sensor may be used to determine wheel speed. The sensor may be communicatively coupled to a controller. In some embodiments, the sensor may process any signals to determine a wheel speed. In other embodiments, the sensor may provide any signals to the controller and the controller may process any signals to determine a wheel speed.

In step 1511, a controller may determine a rate limit based on the wheel speed ($\omega w$). A limit computed from the wheel speed ($\omega w$) may be used as a limit for a position of a rotary encoder or other actuator component.

In step 1513, a controller may receive a position reference value and a rate limit value, and may provide a maximum transmission ratio adjustment rate. In some embodiments, the rate limit value may be limited to a value passed through a rate limiting function, such as described with respect to step 1511.

In step 1518, a value for the requested cadence and the actual cadence can be compared. In some embodiments, a summing function may be used to calculate an error value. If the error value is non-zero, there is the possibility that the system will continually try to adjust the CVT. This can cause issues, such as increased temperature of a motor or increased battery power consumption by the motor, among others. Embodiments may include additional functions or functionality to refine the signal and improve the system performance. In step 1520, a dead band may be determined. A controller may determine a dead band based on bicycle speed, a requested cadence, a wheel speed, a motor rating, a motor duty cycle, a current draw from a battery, a power input from a battery/motor, or some other factor. In step 1522, any value of cadence that is within the range of values defined by the dead band is changed to 0. Steps 1520 and 1522 may reduce the frequency that a CVT may need to be adjusted, which may increase life of the system, improve range of a battery, increase the life of a component such as a motor, cabling, the battery or others. Portions of steps 1520 and 1522 may be performed by a controller.

In step 1524, a motor driver may be operated to achieve the requested cadence. The motor driver may be coupled to a piston, a cam, or some other mechanism for adjusting a transmission ratio of the CVT. In some embodiments, a motor driver may be configured to adjust a tilt angle or a skew angle capable of adjusting a tilt angle. The motor driver may be configured to operate a motor according to a duty cycle. In step 1528, a motor coupled to the motor driver may adjust the transmission ratio of the CVT. The motor driver may provide a signal at a rate between 0 and 100% of a time period. In some embodiments, a rotary encoder position may be adjusted by the motor.

In step 1530, a present rotary encoder position is determined. A rotary encoder position may be used to determine a beta angle (that is, a relative rotation between two stator discs in a CVT). A beta angle may cause a plurality of axles in a ball planetary CVT to have a skew angle. A skew angle causes the CVT to have a tilt angle. Embodiments may determine when to operate the control system. In step 1510, the wheel speed ($\omega w$) may be determined. In step 1532, a controller may determine if the bicycle is operating above a threshold. For example, a threshold value of 20 revolutions per minute (RPM) may be stored in memory. A moving detection function may receive, intercept, or otherwise obtain a value for present wheel speed ($\omega w$) and compare that value to the 20 RPM. If the present wheel speed is equal to or greater than the threshold value, a signal (e.g. a flag) may be sent to the motor driver, allowing the motor driver to operate the motor. If the present wheel speed value is less than the threshold value, the motor driver is not allowed to operate the motor. In step 1536, a controller determines if the motor driver should be allowed to drive a motor.

Blocks 1504, 1505, 1506, 1507, 1513, 1518, 1520, 1522, 1524, 1528, 1530 and 1536 may represent portions of a system or steps in a control process useful for operating a transmission according to manual control.

In step 1504, a controller may request, receive or otherwise obtain an indication of a requested ratio. In step 1505, a controller may compute a transmission ratio based on the wheel speed ($\omega w$) and the ratio of Tf/Tr.

In step 1506, a controller may receive, request or otherwise obtain information about a requested ratio. In some embodiments, an interface may be configured to receive information and determine from the information that a user is coasting.

In step 1507, a controller receives information relating to a requested ratio. Using this information, a controller may provide an estimation of a transmission ratio. In systems in which a relationship between a position and a transmission ratio is non-linear, a controller may refer to a lookup table or other data structure stored in memory to provide an estimation of a transmission ratio.

In step 1510, embodiments may determine a bicycle is moving. A wheel speed sensor may be positioned relative either a front wheel or rear wheel on a bicycle. In some embodiments, a mechanical, electric or magnetic (including some variation such as electromagnetic) sensor may provide the wheel speed ($\omega w$). In one embodiment, a Hall effect sensor may be used to determine wheel speed. The sensor may be communicatively coupled to a controller. In some embodiments, the sensor may process any signals to determine a wheel speed. In other embodiments, the sensor may provide any signals to the controller and the controller may process any signals to determine a wheel speed.

In step 1511, a controller may determine a rate limit based on the wheel speed ($\omega w$). A limit computed from the wheel speed ($\omega w$) may be used as a limit for a position of a rotary encoder or other actuator component.

In step 1513, a controller may receive a position reference value and a rate limit value, and may provide a maximum transmission ratio adjustment rate. In some embodiments, the rate limit value may be limited to a value passed through a rate limiting function, such as described with respect to step 1511.

In step 1518, a value for the requested cadence and the actual cadence can be compared. In some embodiments, a summing function may be used to calculate an error value. If the error value is non-zero, there is the possibility that the system will continually try to adjust the CVT. This can cause issues, such as increased temperature of a motor or increased battery power consumption by the motor, among others. Embodiments may include additional functions or functionality to refine the signal and improve the system performance. In step 1520, a dead band may be determined. A controller may determine a dead band based on bicycle speed, a requested cadence, a wheel speed, a motor rating, a motor duty cycle, a current draw from a battery, a power input from a battery/motor, or some other factor. In step 1522, any value of cadence that is within the range of values defined by the dead band is changed to 0. Steps 1520 and 1522 may reduce the frequency that a CVT may need to be adjusted, which may increase life of the system, improve range of a battery, increase the life of a component such as a motor, etc. Portions of steps 1520 and 1522 may be performed by a controller.

In step 1524, a motor driver may be operated to achieve the requested cadence. The motor driver may be coupled to a piston, a cam, or some other mechanism for adjusting a transmission ratio of the CVT. In some embodiments, a motor driver may be configured to adjust a tilt angle or a skew angle capable of adjusting a tilt angle. The motor driver may be configured to operate a motor according to a duty cycle. In step 1528, a motor coupled to the motor driver may adjust the transmission ratio of the CVT. The motor driver may provide a signal at a rate between 0 and 100% of a time period. In some embodiments, a rotary encoder position may be adjusted by the motor.

In step 1530, a present rotary encoder position is determined. A rotary encoder position may be used to determine a beta angle (i.e., a relative rotation between two discs in a CVT). A beta angle may cause a plurality of axles in a ball planetary CVT to have a skew angle. A skew angle results in the CVT having a tilt angle that shifts the ratio of the CVT. Embodiments may determine when to operate the control system. In step 1510, the wheel speed (ωw) may be determined. In step 1532, a controller may determine if the bicycle is operating above a threshold. For example, a threshold value of 20 revolutions per minute (RPM) may be stored in memory. A moving detection function may receive, intercept, or otherwise obtain a value for present wheel speed (ωw) and compare that value to the 20 RPM. If the present wheel speed is equal to or greater than the threshold value, a signal (for example, a flag) may be sent to the motor driver, allowing the motor driver to operate the motor. If the present wheel speed value is less than the threshold value, the motor driver is not allowed to operate the motor. In step 1536, a controller determines if the motor driver should be allowed to drive a motor.

Embodiments described in the present disclosure allow CVT manufacturers to build, assemble and control CVTs having smaller sizes, weights, and inertias while still providing the same or higher power capacities as prior approaches, and without the associated risks of binding or damage to the CVT or components. It should be noted that the features described herein may be implemented as needed. In other words, some embodiments may operate using only the algorithm to control adjustment rate, only a modified timing plate, only a modified input stator or only a modified output stator to avoid binding, while other embodiments may use a combination of any two or more of the control algorithm, a modified timing plate, a modified input stator and a modified output stator.

It should be noted that the description above has provided dimensions for certain components or subassemblies. The mentioned dimensions, or ranges of dimensions, are provided in order to further describe certain embodiments. However, the scope of the inventions described herein are to be determined solely by the language of the claims, and consequently, none of the mentioned dimensions is to be considered limiting on the inventive embodiments, except in so far as any one claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A stator for a continuously variable transmission (CVT) having a plurality of tiltable planet assemblies, each tiltable planet assembly including a planet and a planet axle, wherein tilting the planet axle changes a transmission ratio of the CVT, the stator comprising:
    a plurality of offset guide slots for receiving an end of a planet axle formed with a curved profile and a diameter, each offset guide slot comprising:
        first and second surfaces for contact with the end of the planet axle, the first and second surfaces separated by a first width to form a desired clearance width based on the diameter of the planet axle; and
        a protuberance on one of a leading surface or a trailing surface, the protuberance forming a second width at a radially outward opening, the second width being less than the first width.

2. The stator of claim 1, wherein the protuberance comprises a curved surface.

3. The stator of claim 2, wherein the first surface, the second surface, and the protuberance form a continuous surface.

4. The stator of claim 3, wherein the protuberance has a radius of curvature substantially equal to a radius of the planet axle.

5. The stator of claim 1, wherein the second width is less than the diameter of the planet axle.

6. A stator assembly for a continuously variable transmission having a plurality of tiltable planet assemblies, each tiltable planet assembly including a planet and a planet axle having a diameter, wherein tilting the planet axle changes a transmission ratio of the CVT, the stator assembly comprising:
    a first stator comprising:
        a plurality of offset guide slots for receiving a first end of each planet axle of the plurality of planet axles, each offset guide slot comprising:
            first and second offset guide slot surfaces for contact with the first end of each planet axle, the first and second offset guide slot surfaces separated by a first width to form a radial opening and to form a desired clearance width based on the diameter of the planet axle; and
    a second stator comprising:
        a plurality of radial guide slots for receiving a second end of a planet axle having a diameter, each radial guide slot comprising:
            first and second radial guide slot surfaces for contact with the second end of the planet axle, the first and second radial guide slot surfaces separated by a first width to form a desired clearance width based on the diameter of the planet axle, wherein each radial guide slot in the second stator is recessed radially inward relative to each offset guide slot of the first stator, and wherein the first stator is rotatable relative to the second stator to adjust a speed ratio of the variator.

7. The stator assembly of claim 6, wherein each radial guide slot is formed having a second width at a radially outward opening, the second width being less than the first width.

8. The stator assembly of claim 7, wherein the second width is less than the diameter of the planet axle.

9. The stator assembly of claim 7, wherein each radial guide slot is formed with a protuberance on one or more of a leading surface and a trailing surface.

10. The stator assembly of claim 6, further comprising a timing plate interposed between a plurality of planets and the first stator, the timing plate having a plurality of timing slots formed by a first timing slot surface and a second timing slot surface.

11. The stator assembly of claim 10, wherein the first stator has an outer diameter greater than an outer diameter of the timing plate.

12. A continuously variable transmission having a plurality of tiltable planet assemblies, each tiltable planet assembly including a planet and a planet axle having a diameter, wherein tilting the planet axle changes a transmission ratio of the CVT, the CVT comprising:
a first stator comprising:
a plurality of offset guide slots for receiving a first end of each planet axle of the plurality of planet axles, each offset guide slot comprising first and second offset guide slot surfaces for contact with the first end of each planet axle, the first and second offset guide slot surfaces separated by a first width to form a radial opening and to form a desired clearance width based on the diameter of the planet axle;
a second stator comprising:
a plurality of radial guide slots for receiving a second end of a planet axle having a diameter, each radial guide slot comprising first and second radial guide slot surfaces for contact with the second end of the planet axle, the first and second radial guide slot surfaces separated by a first width to form a desired clearance width based on the diameter of the planet axle; and
a timing plate interposed between the plurality of planets and the first stator, the timing plate comprising a plurality of timing slots formed by a first timing slot surface and a second timing slot surface.

13. The stator assembly of claim 12, wherein the first stator has an outer diameter greater than an outer diameter of the timing plate.

14. The stator assembly of claim 13, wherein each radial guide slot in the second stator is recessed radially inward relative to each offset guide slot of the first stator.

15. The stator assembly of claim 13, wherein each radial guide slot is formed with a protuberance on one or more of a leading surface and a trailing surface.

* * * * *